(12) United States Patent
Ozawa

(10) Patent No.: US 10,032,059 B2
(45) Date of Patent: Jul. 24, 2018

(54) IMAGE ANALYZING APPARATUS THAT IDENTIFIES BARCODE IMAGE IN TARGET IMAGE

(71) Applicant: BROTHER KOGYO KABUSHIKI KAISHA, Nagoya, Aichi (JP)

(72) Inventor: Ryohei Ozawa, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/448,876

(22) Filed: Mar. 3, 2017

(65) Prior Publication Data

US 2017/0286737 A1    Oct. 5, 2017

(30) Foreign Application Priority Data

Mar. 30, 2016  (JP) ................................. 2016-068649

(51) Int. Cl.
| | |
|---|---|
| *G06K 5/04* | (2006.01) |
| *G06K 7/10* | (2006.01) |
| *G06K 9/32* | (2006.01) |
| *G06K 7/14* | (2006.01) |
| *G06K 9/18* | (2006.01) |
| *G06K 9/46* | (2006.01) |
| *G06K 9/62* | (2006.01) |
| *G06K 19/06* | (2006.01) |

(52) U.S. Cl.
CPC ......... *G06K 7/1456* (2013.01); *G06K 7/1413* (2013.01); *G06K 7/1443* (2013.01); *G06K 9/183* (2013.01); *G06K 9/4609* (2013.01); *G06K 9/6202* (2013.01); *G06K 19/06028* (2013.01)

(58) Field of Classification Search
CPC .. G06K 5/04; G06K 7/10; G06K 9/32; G06K 19/06; G06F 17/00
USPC .......... 235/462.08, 462.01, 462.16, 494, 375
See application file for complete search history.

(56) References Cited

U.S. PATENT DOCUMENTS

| | | | | |
|---|---|---|---|---|
| 6,565,003 | B1 * | 5/2003 | Ma ..................... | G06K 7/10861 |
| | | | | 235/462.08 |
| 9,607,200 | B2 * | 3/2017 | Bachelder ............ | G06K 7/1452 |

(Continued)

FOREIGN PATENT DOCUMENTS

| | | |
|---|---|---|
| JP | H05-101214 A | 4/1993 |
| JP | H09-16701 A | 1/1997 |

(Continued)

*Primary Examiner* — Edwyn Labaze
(74) *Attorney, Agent, or Firm* — Scully, Scott, Murphy & Presser, P.C.

(57) ABSTRACT

In an image analyzing apparatus, identifying a barcode image includes: determining a bar candidate area representing a candidate for a bar having a first width in a target image, the bar candidate area containing a feature-matching area that matches a feature concerning two or more different widths of bars in a one-dimensional barcode; searching for first and second blank areas having lengths longer than or equal to a threshold value at first and second sides of the bar candidate area in a specific direction; when the first or second blank area is found, determining, as a first or second end position of the one-dimensional barcode, a boundary between the first or second blank area and a non-background area; and by using the first and second end positions, identifying an area containing the bar candidate area as the barcode image.

15 Claims, 10 Drawing Sheets

(56) References Cited

U.S. PATENT DOCUMENTS

| | | | | |
|---|---|---|---|---|
| 2009/0001167 A1* | 1/2009 | Usuba | .................... | G06K 7/10 235/462.16 |
| 2013/0294700 A1* | 11/2013 | Kaftory | ............... | G06K 9/3241 382/195 |
| 2016/0104022 A1* | 4/2016 | Negro | ................. | G06K 7/1452 235/462.16 |

FOREIGN PATENT DOCUMENTS

| | | |
|---|---|---|
| JP | H09-251508 A | 9/1997 |
| JP | 2006-330906 A | 12/2006 |

\* cited by examiner

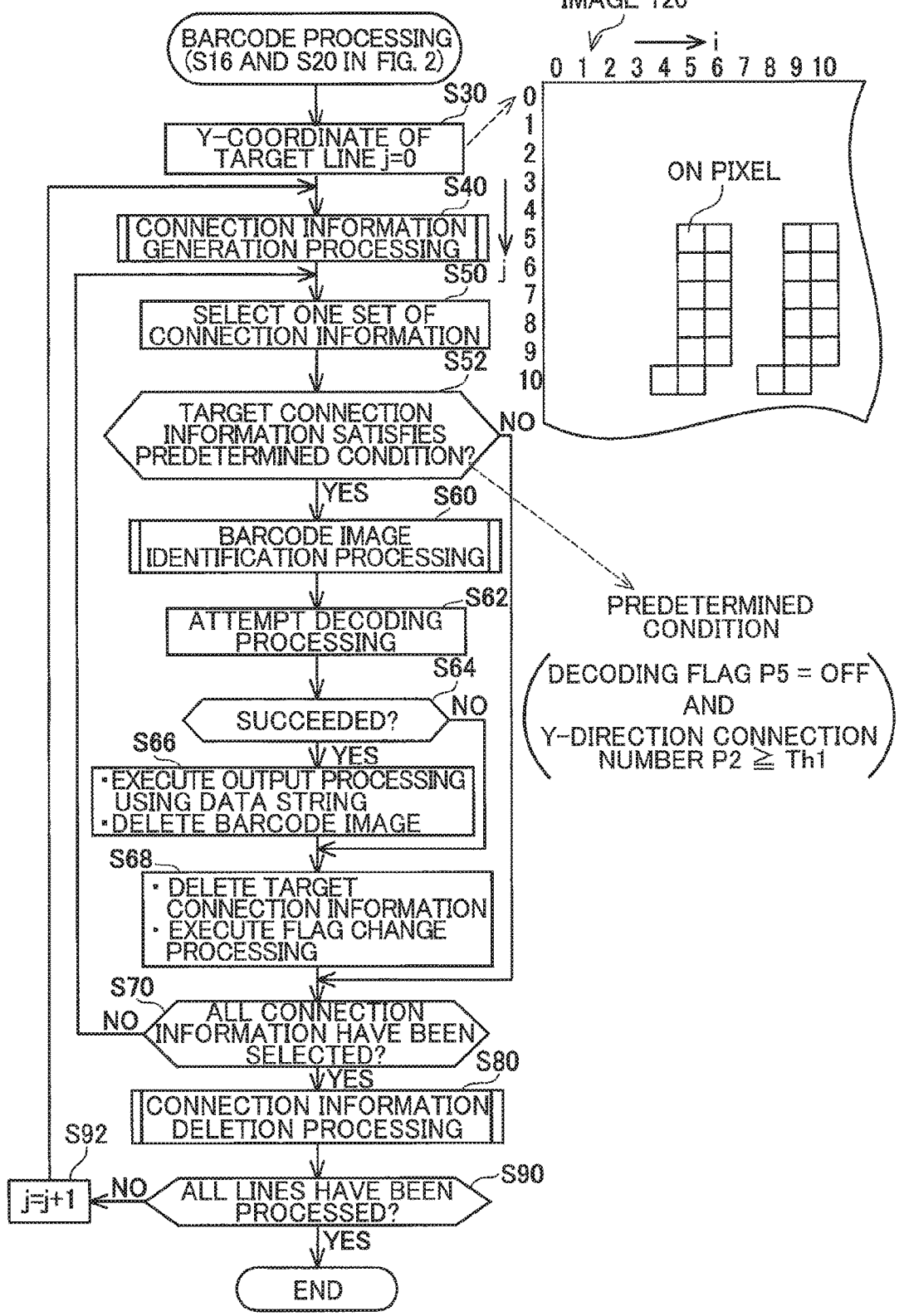

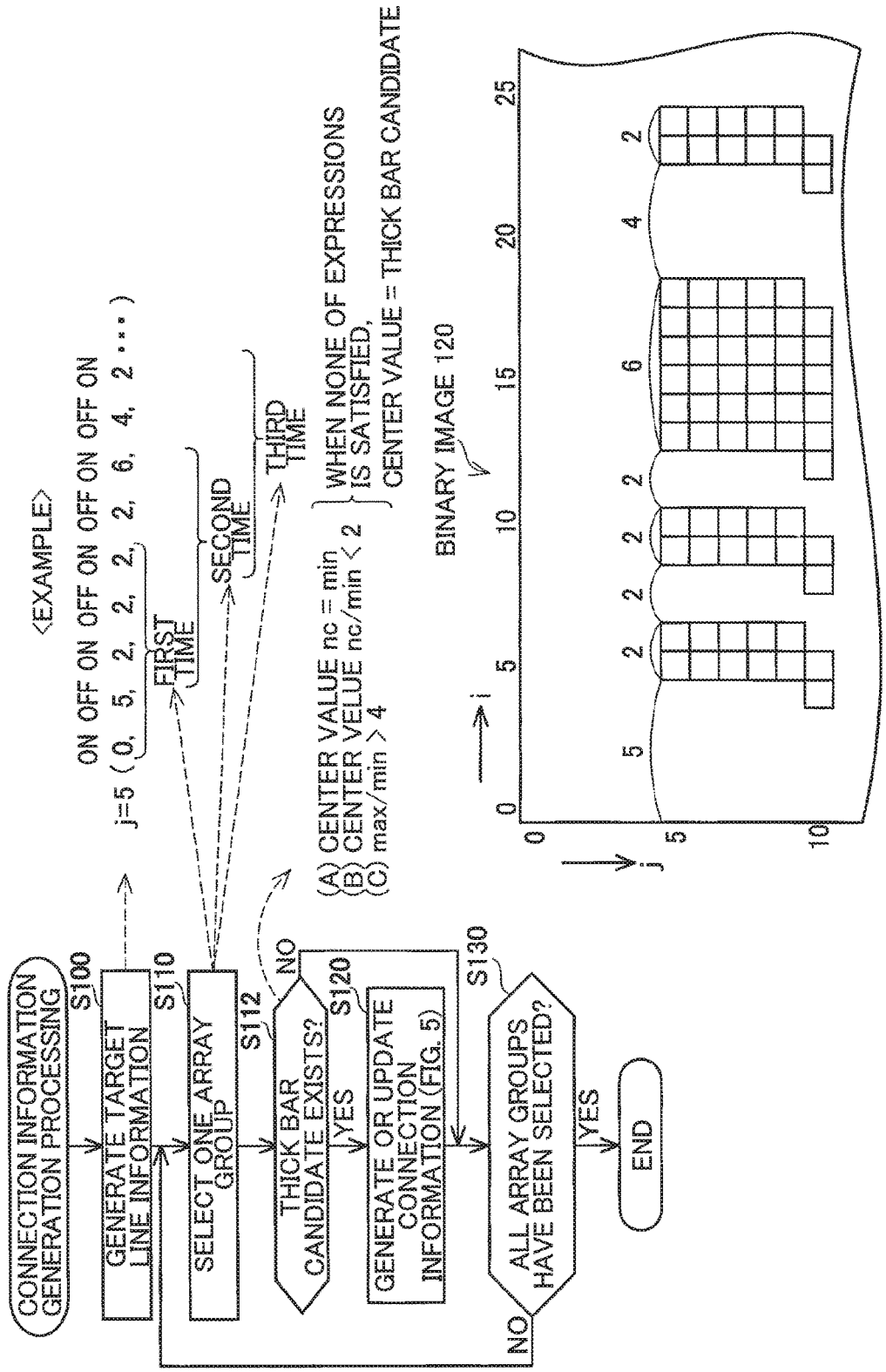

FIG. 5

(S120 IN FIG. 4: GENERATE OR UPDATE CONNECTION INFORMATION)

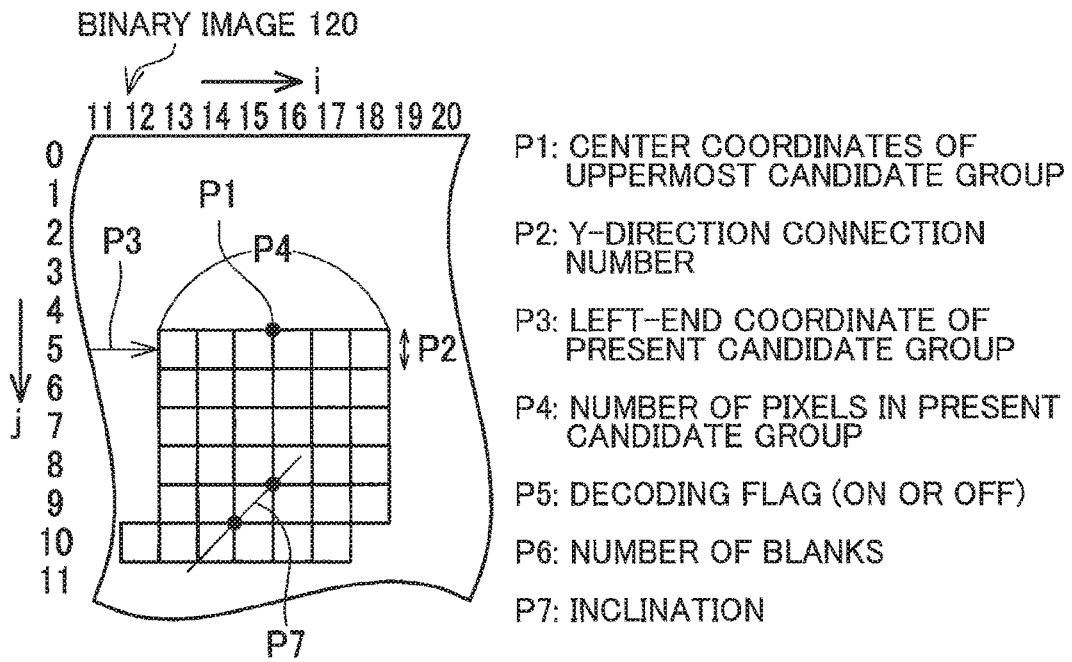

P1: CENTER COORDINATES OF UPPERMOST CANDIDATE GROUP

P2: Y-DIRECTION CONNECTION NUMBER

P3: LEFT-END COORDINATE OF PRESENT CANDIDATE GROUP

P4: NUMBER OF PIXELS IN PRESENT CANDIDATE GROUP

P5: DECODING FLAG (ON OR OFF)

P6: NUMBER OF BLANKS

P7: INCLINATION

| (j = 5) GENERATION | (j = 6) UPDATE | (j = 9) UPDATE | (j = 10) UPDATE |
|---|---|---|---|
| P1 = (16, 5) | P1 = (16, 5) | P1 = (16, 5) | P1 = (16, 5) |
| P2 = 1 | P2 = 2 | P2 = 5 | P2 = 6 |
| P3 = 13 | P3 = 13 | P3 = 13 | P3 = 12 |
| P4 = 6 | P4 = 6 | P4 = 6 | P4 = 6 |
| P5 = OFF | P5 = OFF | P5 = OFF | P5 = OFF |
| P6 = 0 | P6 = 0 | P6 = 0 | P6 = 0 |
| P7 = 0 | P7 = 0 | P7 = 0 | P7 = −1 |

(S220 IN FIG. 6: IDENTIFY BARCODE IMAGE)

(S66 IN FIG. 3)

FIG. 10
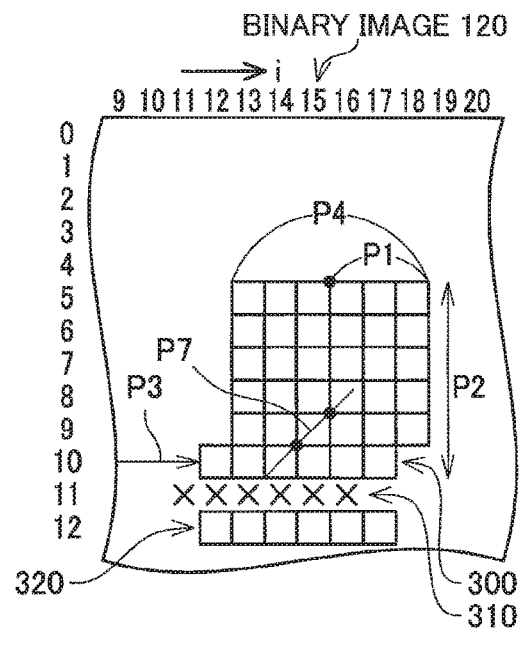
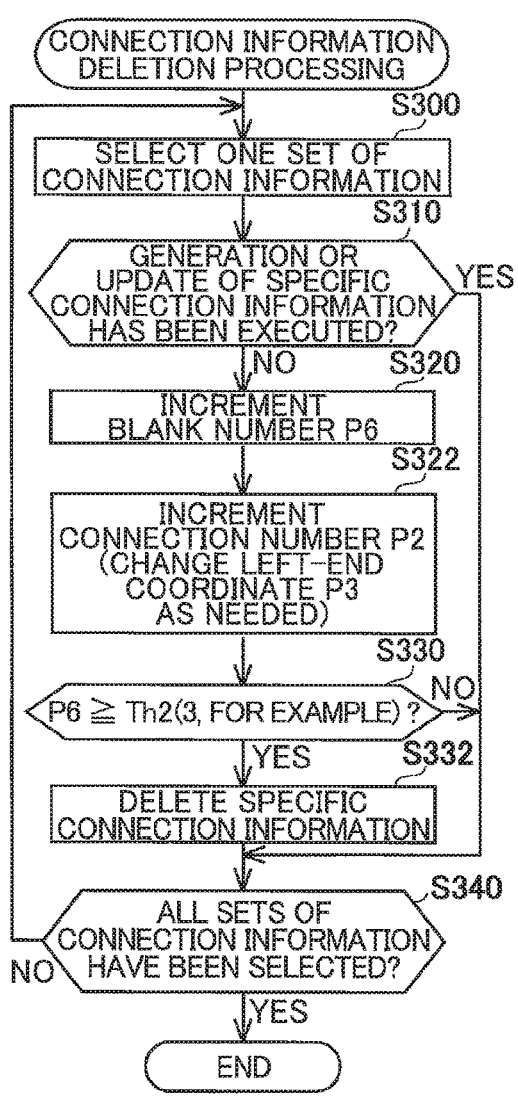
(j = 10)  (j = 11)
P1 = (16, 5)
P2 = 6  → P2 = 7
P3 = 12  → P3 = 11
P4 = 6
P5 = OFF
P6 = 0  → P6 = 1
P7 = −1
(j = 12)       THERE ARE NO
P1 = (16, 5)   ON PIXELS
               CONNECTED WITH
P2 = 8         PREVIOUS
P3 = 12        CANDIDATE GROUP
P4 = 6
P5 = OFF
P6 = 0
P7 = 1

IMAGE ANALYZING APPARATUS THAT IDENTIFIES BARCODE IMAGE IN TARGET IMAGE

CROSS REFERENCE TO RELATED APPLICATION

This application claims priority from Japanese Patent Application No. 2016-068649 filed Mar. 30, 2016. The entire content of the priority application is incorporated herein by reference.

TECHNICAL FIELD

The present disclosure relates to an image analyzing apparatus for identifying a barcode image representing a one-dimensional barcode in a target image.

BACKGROUND

Various technologies for identifying a one-dimensional barcode in an image are known. For example, there has been proposed such a technology, in which the entire area of image data is sequentially scanned, whereby a tentative barcode area in which black and white patterns appear alternately is extracted. Then, it is determined whether or not predetermined bar patterns exist in the tentative barcode area so as to extract a true barcode area. Specifically, a pattern of guard bars composed of two black bars and a white bar between the two black bars and a pattern of center bars composed of three white bars and two black bars between the three white bars are previously registered in a memory. It is determined whether or not the registered guard bar pattern exists at each of both ends of the tentative barcode area and the registered center bar pattern exists at the center of the tentative barcode area.

SUMMARY

In the above-described conventional technology, however, pattern matching of the guard bar is executed at each of the both ends of the tentative barcode area, and pattern matching of the center bar is executed at the center of the tentative barcode area. This may increase processing time for extracting the true barcode area.

It is therefore an object of the disclosure to provide such a technology that is capable of reducing processing time for identifying a barcode image representing a one-dimensional barcode.

According to one aspect, an image analyzing apparatus includes a controller configured to perform:

acquiring target image data that is generated by executing reading of an original sheet containing a one-dimensional barcode, the one-dimensional barcode being composed of a plurality of bars having two or more different widths, the two or more different widths including a first width, the target image data representing a target image containing a background area representative of a background in the original sheet and a non-background area representative of an area other than the background;

identifying a barcode image that is part of the target image and represents the one-dimensional barcode; and executing an output process with respect to the identified barcode image;

the identifying a barcode image includes:

determining a bar candidate area in the target image, the bar candidate area representing a candidate for a bar having the first width, the bar candidate area containing a feature-matching area that matches a feature concerning the two or more different widths of the bars in the one-dimensional barcode;

searching for a first blank area and a second blank area at a first side and a second side, respectively, of the bar candidate area with respect to a specific direction, each of the first and second blank areas being part of the background area and having a length in the specific direction longer than or equal to a threshold value;

when the first blank area is found at the first side of the bar candidate area, determining, as a first end position of the one-dimensional barcode, a boundary between the first blank area and a non-background area that is at a second side of the first blank area and is adjacent to the first blank area;

when the second blank area is found at the second side of the bar candidate area, determining, as a second end position of the one-dimensional barcode, a boundary between the second blank area and a non-background area that is at a first side of the second blank area and is adjacent to the second blank area; and by using the first end position and the second end position, identifying an area containing the bar candidate area as the barcode image.

According to another aspect, a non-transitory computer readable storage medium stores a set of program instructions for an image analyzing apparatus. The image analyzing apparatus includes a processor. The program instructions, when executed by the processor, cause the image analyzing apparatus to perform:

acquiring target image data that is generated by executing reading of an original sheet containing a one-dimensional barcode, the one-dimensional barcode being composed of a plurality of bars having two or more different widths, the two or more different widths including a first width, the target image data representing a target image containing a background area representative of a background in the original sheet and a non-background area representative of an area other than the background;

identifying a barcode image that is part of the target image and represents the one-dimensional barcode; and executing an output process with respect to the identified barcode image;

the identifying a barcode image includes:

determining a bar candidate area in the target image, the bar candidate area representing a candidate for a bar having the first width, the bar candidate area containing a feature-matching area that matches a feature concerning the two or more different widths of the bars in the one-dimensional barcode;

searching for a first blank area and a second blank area at a first side and a second side, respectively, of the bar candidate area with respect to a specific direction, each of the first and second blank areas being part of the background area and having a length in the specific direction longer than or equal to a threshold value;

when the first blank area is found at the first side of the bar candidate area, determining, as a first end position of the one-dimensional barcode, a boundary between the first blank area and a non-background area that is at a second side of the first blank area and is adjacent to the first blank area;

when the second blank area is found at the second side of the bar candidate area, determining, as a second end position of the one-dimensional barcode, a boundary between the second blank area and a non-background area that is at a first side of the second blank area and is adjacent to the second blank area; and by using the first end position and the second end position, identifying an area containing the bar candidate area as the barcode image.

BRIEF DESCRIPTION OF THE DRAWINGS

The particular features and advantages of the disclosure will become apparent from the following description taken in connection with the accompanying drawings, in which:

FIG. 3 shows a flowchart of a barcode processing shown in FIG. 2, and illustrates how to set a target line in a binary image;

FIG. 4 shows a flowchart of a connection information generation processing shown in FIG. 3, and illustrates how to generate target line information and select an array group;

FIG. 5 illustrates how to generate and update the connection information;

FIG. 10 shows a flowchart of a connection information deletion processing shown in FIG. 3, and illustrates how to connect a virtual candidate group to connected candidate groups.

DETAILED DESCRIPTION

Figure 1:
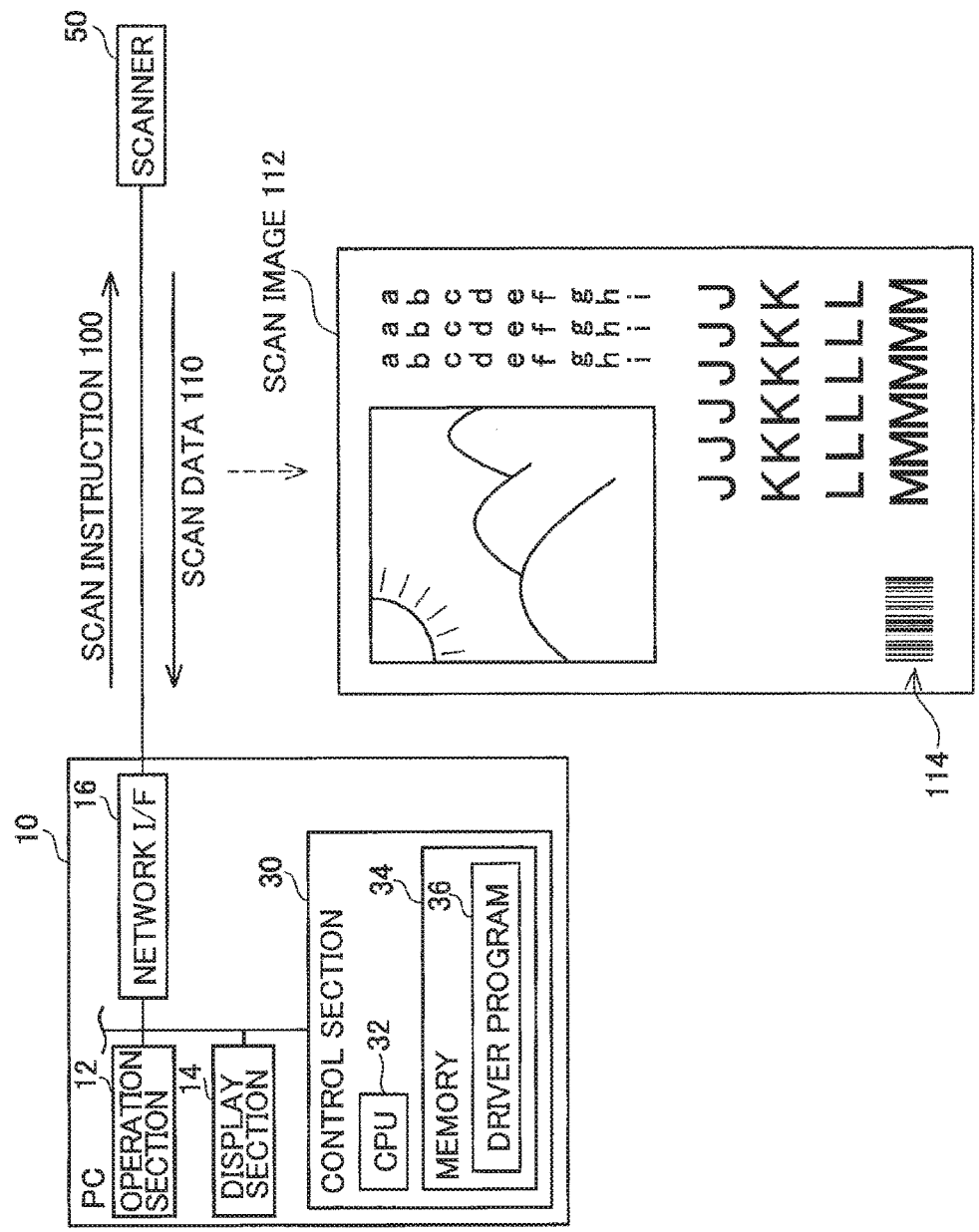
FIG. 1 schematically shows a hardware configuration of a personal computer (PC) serving as an image analyzing apparatus according to an embodiment.

An image analyzing apparatus according to an embodiment will be described while referring to the accompanying drawings wherein like parts and components are designated by the same reference numerals to avoid duplicating description.

(Configuration of PC 10; FIG. 1)

A PC 10 is connected to a scanner 50 via a LAN (Local Area Network) such that the PC 10 is capable of communicating with the scanner 50. The PC 10 includes an operation section 12, a display section 14, a network interface 16, and a control section 30. The operation section 12 includes a mouse and a keyboard. A user can input various instructions to the PC 10 by operating the operation section 12. The display section 14 is a display for displaying various information. The network interface 16 is connected to the LAN.

The control section 30 includes a CPU 32 and a memory 34. The memory 34 includes a ROM (Read Only Memory) and a RAM (Random Access Memory). The CPU 32 is a processor that executes various processing (e.g., the processing routine of FIG. 2) according to corresponding programs stored in the memory 34. The programs include a non-illustrated OS (Operating System) and a driver program 36.

The driver program 36 is a program provided by a vender of the scanner 50 and is used for executing processing concerning the scanner 50. The driver program 36 may be installed in the PC 10 from a medium shipped together with the scanner 50, or from an Internet server provided by the vender of the scanner 50.

When a user operates the operation section 12 to perform a scan execution operation indicative of his/her desire to scan a document, the CPU 32 accepts the user's scan execution operation and supplies a scan instruction 100 to the scanner 50 so as to control the scanner 50 to execute document reading to read an original sheet (document). The scan instruction 100 includes read settings, such as read resolution and size of the original sheet. The scanner 50 executes document reading according to the read settings to generate scan data 110. Then, the scanner 50 supplies the scan data 110 to the PC 10. Thus, the CPU 32 acquires the scan data 110 from the scanner 50.

Particularly, in the present embodiment, a user can operate the operation section 12 to perform a decoding operation indicative of his/her desire to decode a one-dimensional barcode included in a document. The one-dimensional barcode represents a combination of characters and symbols using a plurality of bars. Examples of such a document containing a one-dimensional barcode include: a document used in an office; and a medical chart used in a hospital. For example, a one-dimensional barcode included in an office document indicates characters and symbols identifying a storage folder, in which scan data representing the office document should be stored. For example, a one-dimensional barcode included in a medical chart indicates characters and symbols identifying a patient for the medical chart. When the CPU 32 accepts the user's decoding operation and the CPU 32 acquires the scan data 110, the CPU 32 identifies a barcode image 114 representing a one-dimensional barcode in a scan image 112 represented by the scan data 110, and decodes the barcode image 114. Then, the CPU 32 executes a processing according to the results of the decoding. For example, the CPU 32 stores the scan data 110 in a folder in the memory 34 indicated by the decoded results. The CPU 32 outputs scan data 110 and information of the patient indicated by the decoded results to a medical application program (not illustrated) stored in the memory 34.

Next will be described a one-dimensional barcode (hereinafter, referred to merely as "barcode"). There are known barcodes of various standards, such as JAN (Japanese Article Number) code, EAN (European Article Number) code, ITF (Interleaved Two of Five) code, CODE 39, CODE 128, and NW-7 (CODEBAR). The barcode of any standard is composed of: a plurality of bars constituted by a combination of two or more types of bars having two or more different widths (black bars); and blanks between two adjacent bars (white bars). Among the two or more types of bars having two or more different widths, bars having the minimum width are referred to as "thin bars", and bars other than the thin bars are referred to as "thick bars". The driver program 36 of the present embodiment supports barcodes of the plurality of standards. That is, the driver program 36 can identify the barcode image 114 in the scan image 112 that represents a barcode of any of the standards described above.

The barcode image 114 constitutes a small part of the scan image 112. For example, the barcode image 114 has a size ¼ or smaller the size of the scan image 112. The driver program 36 can quickly identify the very small barcode image 114 included in the scan image 112.

Figure 2:
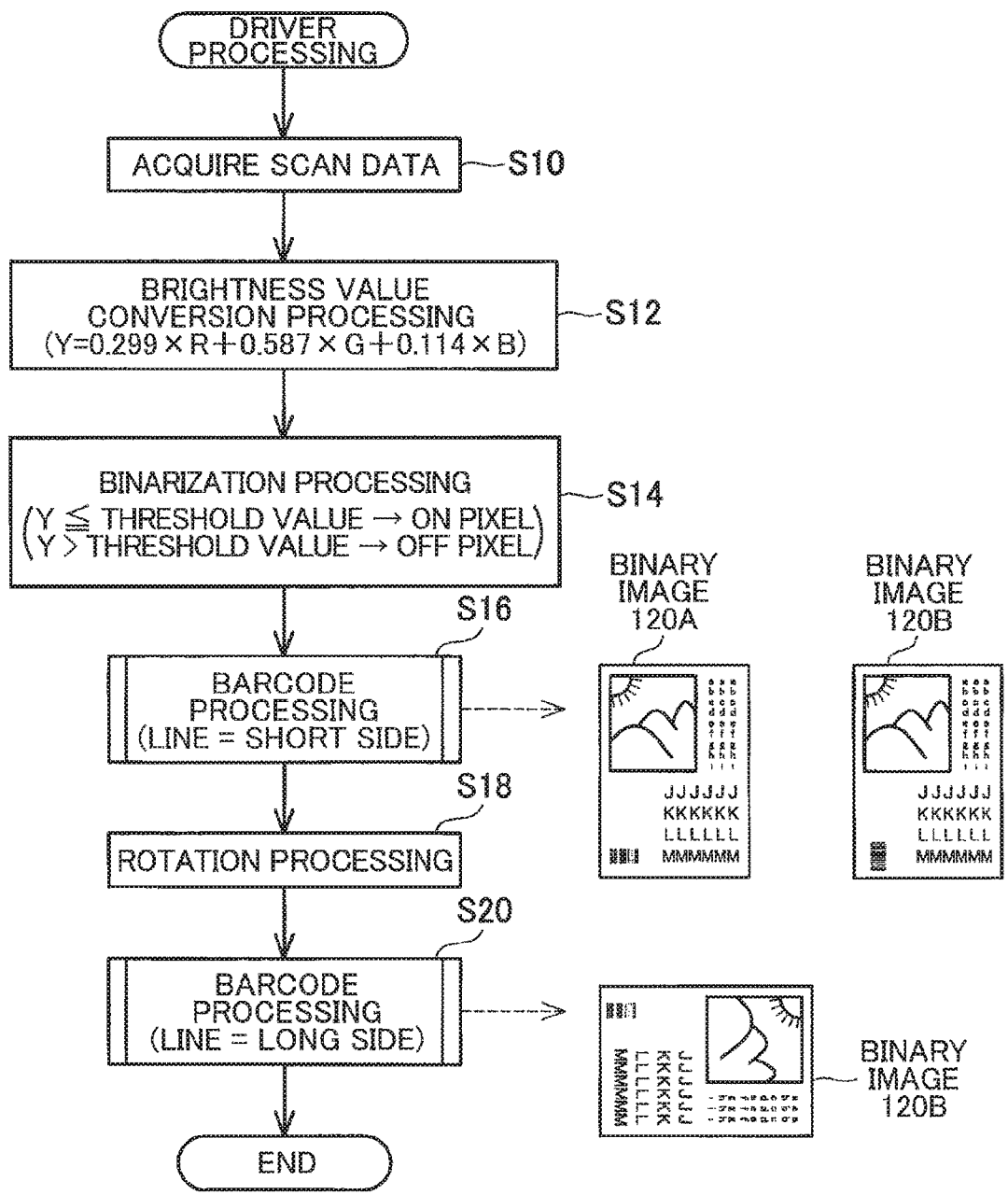
FIG. 2 is a flowchart of a driver processing executed by the PC shown in FIG. 1.

(Processing of Driver Program 36 of PC 10; FIG. 2)

With reference to FIG. 2, driver processing that the CPU 32 executes according to the driver program 36 upon reception of the user's decoding operation will be described.

In S10, the CPU 32 acquires the scan data 110 representing the scan image 112 including the barcode image 114 from the scanner 50 through the network interface 16. The scan data 110 is composed of a plurality of sets of pixel data. Each set of pixel data represents pixel values of 256 gradations ("0 to 255") (specifically, R value, G value, and B value).

In S12, the CPU 32 executes brightness value conversion processing for the scan data 110. Specifically, the CPU 32 converts the set of pixel values (i.e., R value, G value, and B value) represented by each of the plurality of pixel data constituting the scan data 110 into a brightness value (Y value) according to the following formula to generate new pixel data representing a pixel value of 256 gradations ("0 to 255"):

$$Y=0.299 \times R+0.587 \times G+0.114 \times B$$

As a result, brightness image data composed of a plurality of new pixel data each representing a brightness value is generated. In the present embodiment, the original sheet read by the scanner 50 has white color (R=G=B=255) background. Therefore, the brightness value (Y value) representing the background of the original sheet is normally 255, while the brightness value representing the area other than the background is normally smaller than 255.

In S14, the CPU 32 executes binarization processing for the brightness image data generated in S12. Specifically, the CPU 32 converts the brightness value represented by each of the plurality of pixel data constituting the brightness image data into "1" or "0" to generate new pixel data representing "1" or "0". More specifically, when the brightness value is smaller than or equal to a predetermined threshold value for binarization (e.g., 200), new pixel data representing "1" is generated, while when the brightness value is greater than the threshold value for binarization, new pixel data representing "0" is generated. That is, the pixel data representing the background of the original sheet is represented by "0", and pixel data representing the area other than the background is represented by "1". As a result, binary image data composed of a plurality of new pixel data representing "1" or "0" is generated. Hereinafter, the pixel data representing "1" and the pixel data representing "0" are referred to as "ON pixel data" and "OFF pixel data", respectively.

In FIG. 2, two binary images 120A and 120B are illustrated as examples of a binary image represented by the binary image data generated in S14. In each of the binary images 120A and 120B, an ON pixel represented by the ON pixel data and an OFF pixel represented by the OFF pixel data are represented by black color and white color, respectively. In the binary image 120A, each of bars constituting the barcode extends along the long side of the binary image 120A. In the binary image 120B, each of bars constituting the barcode extends along the short side of the binary image 120B.

In S16, the CPU 32 executes barcode processing for the binary image data generated in S14. The barcode processing is processing for identifying a barcode image included in the binary image (e.g., the binary image 120A) and executing decoding of the identified barcode image. In S16, the CPU 32 executes the barcode processing such that each pixel group composed of a plurality of pixels arranged along the short side of the binary image is regarded as one line. In this case, the CPU 32 can identify the barcode image included in the binary image 120A, but cannot identify the barcode image included in the binary image 120B.

In S18, the CPU 32 executes rotation processing for the binary image data generated in S14 to rotate the binary image data by 90 degrees to thereby generate rotated image data.

In S20, the CPU 32 executes barcode processing for the rotated image data generated in S18. In S20, the CPU 32 executes the barcode processing such that each pixel group composed of a plurality of pixels arranged along the long side of a binary image is regarded as one line. In this case, the CPU 32 can identify the barcode image included in the binary image 120B, but cannot identify the barcode image included in the binary image 120A.

In the present embodiment, not only the process of S16, but also the processes of S18 and S20 are executed. Accordingly, a barcode image can be appropriately identified irrespective of the orientation of the barcode in the original sheet. As a modification, when a barcode image is identified in S16, the processes of S18 and S20 need not be executed. After completion of S20, the processing routine of FIG. 2 is ended.

(Barcode Processing; FIG. 3)

With reference to FIG. 3, the contents of the barcode processing in each of the processes of S16 and S20 in FIG. 2 will be described. In S30, the CPU 32 first sets a Y-coordinate j of a line to be processed (hereinafter, referred to as "target line") to zero (0). The line corresponds to a pixel group composed of a plurality of pixels arranged in the left-right direction (X-direction) of a binary image 120. In S16 of FIG. 2, the direction in which the short side of the binary image 120 extends is defined as the X-direction. In S20, the direction in which the long side of the binary image 120 extends is defined as the X-direction. In the binary image 120 of FIG. 3, each area surrounded by a solid outline correspond to an ON pixel, and each area surrounded by no solid outline corresponds to an OFF pixel. The same applies to FIG. 4 and subsequent drawings.

In S40, the CPU 32 analyzes the target line and generates connection information in the memory 34 (see FIG. 4). It is noted that one set of connection information indicates an area representing a candidate of a thick bar that exists on one or more lines that are arranged continuously in the Y direction and include the target line.

In S50, the CPU 32 selects one set of connection information (hereinafter, referred to as "target connection information") from among one or more sets of connection information generated in S40. When no connection information exists in the memory 34, the CPU 32 skips S50 to S80.

In S52, the CPU 32 determines whether or not the target connection information satisfies a predetermined condition. When the CPU 32 determines that the target connection information satisfies the predetermined condition (YES in S52), the CPU 32 advances to S60. On the other hand, when the CPU 32 determines that the target connection information does not satisfy the predetermined condition (NO in S52), the CPU 32 skips S60 to S68 and advances to S70.

Figure 6:
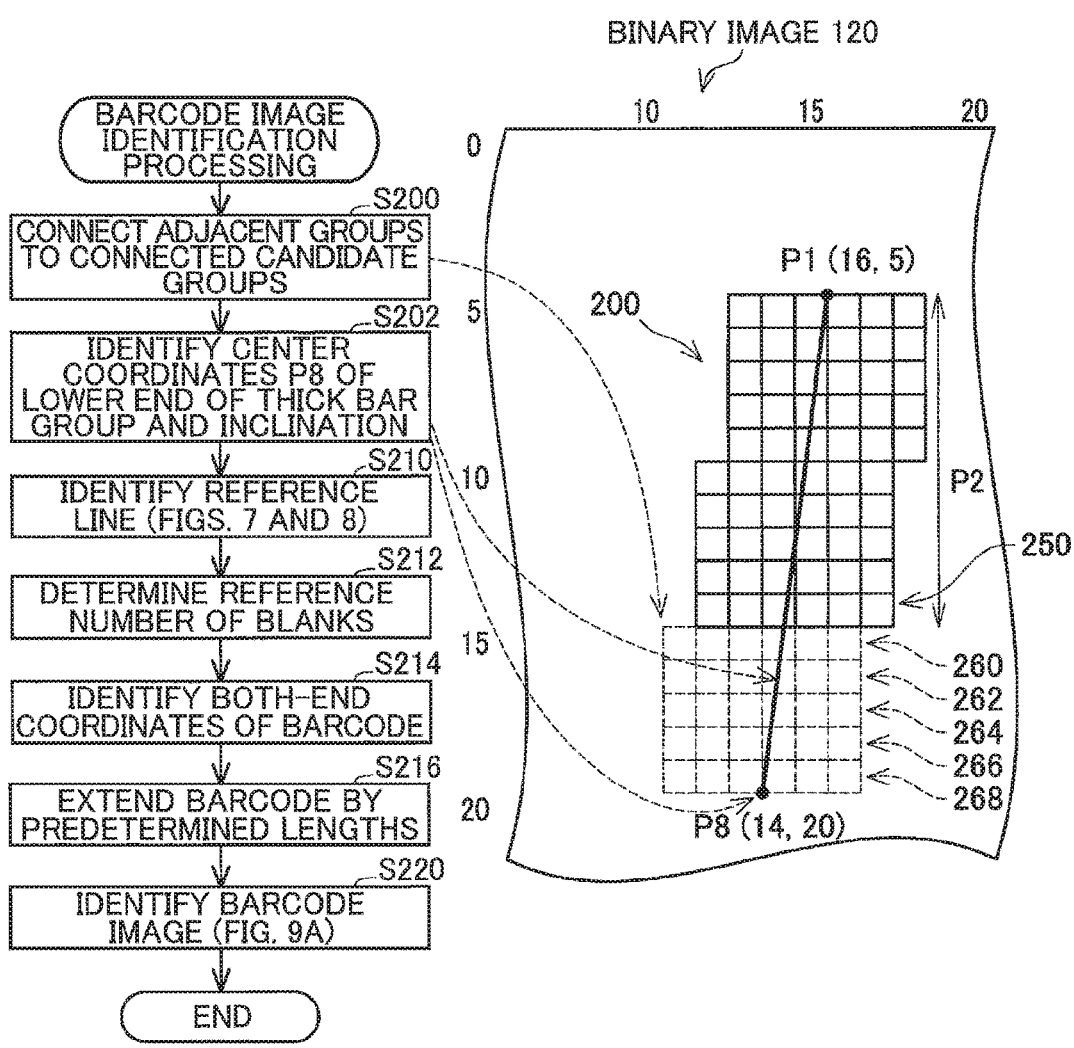
FIG. 6 shows a flowchart of a barcode image identification processing shown in FIG. 3, and illustrates how to connect adjacent groups to connected candidate groups.

In S60, the CPU 32 uses the target connection information to identify the barcode image constituting a part of the binary image 120 (see FIG. 6).

In S62, the CPU 32 attempts to execute a decoding processing on the barcode image identified in S60. The decoding processing is processing for identifying a combination of characters and symbols (hereinafter, referred to as "data string") from the plurality of bars included in the barcode image. Specifically, the CPU 32 first identifies, from the barcode image, the widths of respective bars (i.e., the numbers of continuous ON pixels) and widths of blanks between adjacent bars (i.e., the numbers of continuous OFF pixels). Then, the CPU 32 attempts to identify numerals, alphabets, and symbols by using the identified bar widths and blank widths, in regard to each of the plurality of standards supported by the driver program 36. For example, in the JAN code or EAN code, a combination of two bars indicates one of numerals 0 to 9. Accordingly, the CPU 32 identifies the numeral indicated by the two bars based on the widths of the bars and blank between the bars. The CPU 32 tries to identify a data string composed of two or more numerals from the plurality of bars. On the other hand, in CODE 128, for example, a combination of three bars indicates any one of: a numeral (0 to 9); an alphabet (A to U); and a symbol ("!", "%", etc.). The CPU 32 identifies the numeral or the like indicated by the three bars based on the widths of the three bars and two blanks between the three bars. The CPU 32 tries to identify a data string composed of two or more numerals, alphabets, or symbols from the plurality of bars. The CPU 32 tries to execute decoding processing according to the plurality of standards supported by the driver program 36 in succession.

In S64, the CPU 32 determines whether or not the decoding processing has been successfully executed in S62. Specifically, when a data string has been obtained based on all the bars included in the barcode image through execution of a decoding processing according to some standard, the CPU 32 determines that the decoding processing has been successfully executed (YES in S64), and advances to S66, in which the CPU 32 executes output processing using the obtained data string. Examples of the output processing include: processing of storing the scan data 110 in a folder in the memory 34 indicated by the data string; processing of outputting information indicated by the data string (e.g., information concerning a patient) and scan data 110 to another application program (e.g., medical application program) stored in the memory 34; and processing of transmitting the scan data 110 to a destination indicated by the data string (e.g., another device on the LAN network). On the other hand, when numerals or the like have not been obtained from at least one bar in the barcode image through execution of a decoding processing according to any of the plurality of standards, the CPU 32 determines that the decoding processing has failed (NO in S64). Then, the CPU 32 skips S66 and advances to S68.

As a modification, the decoding processing of S62 need not be executed. In this case, the judging processing of S64 is not executed, either. The process proceeds directly from S60 to S66, in which the CPU 32 may store image data representing the barcode image in a prescribed folder in the memory 34, transmit the image data to an external device, output the image data to another application program, or paste the image data to a prescribed position in a prescribed file. Both of the processing of decoding the barcode image and outputting the decoded results according to the present embodiment and the process of outputting the image data of the barcode image according to the modification are examples of output processing concerning the barcode image.

In S66, after executing the output processing, the CPU 32 deletes the barcode image identified in S60 from the binary image 120. Specifically, the CPU 32 identifies, in the binary image 120, those ON pixels that are among the pixels constituting the barcode image, and changes the identified ON pixels to OFF pixels. It is noted that if a barcode image successfully decoded at the present target line were not deleted, the same barcode image will be identified again in the processes of S40 to S60 that will be executed onto subsequent target lines following the present target line. This will result in that the decoded barcode image is decoded again in S62. Contrarily, in the present embodiment, the decoded barcode image is deleted in S66. Accordingly, the decoded barcode image can be prevented from being identified again, with the result that a processing load can be reduced.

In S68, the CPU 32 deletes the target connection information. Thus, after some barcode image is identified based on a thick bar corresponding to the target connection information, the same barcode image can be prevented from being identified again based on the same connection information. The CPU 32 changes, from "OFF" to "ON", a decoding flag (to be described later) that is included in another set of connection information corresponding to another thick bar that is contained in the barcode image identified in S60. Thus, after some barcode image is identified based on a set of target connection information corresponding to a thick bar in the barcode image, the same barcode image can be prevented from being identified again based on another set of connection information corresponding to another thick bar included in the same barcode image. Details of the flag change processing will be described later.

In S70, the CPU 32 determines whether or not all the sets of connection information stored in the memory 34 have been selected in S50. When all the connection information have not yet been selected (NO in S70), the CPU 32 returns to S50, where the CPU 32 selects another set of connection information and executes the processes of S52 to S68 again. On the other hand, when all the sets of connection information have been selected (YES in S70), the CPU 32 deletes unnecessary connection information in S80 (to be described later with reference to FIG. 10).

In S90, the CPU 32 determines whether or not all the lines constituting the binary image 120 have been processed. When all the lines have not yet been processed (NO in S90), the CPU 32 increments the Y-coordinate j of a target line in S92 and executes the processing of S40 and subsequent steps corresponding to a new target line. On the other hand, when all the lines constituting the binary image 120 have been processed (YES in S90), the CPU 32 ends the processing routine of FIG. 3.

(Connection Information Generation Processing; FIG. 4)

With reference to FIG. 4, the contents of the connection information generation processing executed in S40 of FIG. 3 will be described. First in S100, the CPU 32 uses the target line to generate target line information. The target line information indicates a numerical array in which the number of continuous ON pixels and the number of continuous OFF pixels are alternately arranged from the left. The CPU 32 scans the target line from the left to right to sequentially identify the number of continuous ON pixels and the number of continuous OFF pixels. Then, the CPU 32 determines the target line information indicating a numerical array including the identified numbers of ON and OFF pixels. It is noted that a numeral that is at the leftmost position in the numerical array of the target line information indicates the number of continuous ON pixels that appears at the leftmost position in the target line. When the leftmost pixel (i.e., pixel corresponding to "i=0") constituting the target line is an OFF pixel, the number of continuous ON pixels appearing at the leftmost position in the target line is zero (0). Accordingly, the CPU 32 sets "0" as the leftmost numeral constituting the numerical array in the target line information.

For example, in the binary image 120 shown in FIG. 4, the target line of "j=0" is composed of only the OFF pixels, so that the CPU 32 generates a numerical array (0, L) as the target line information, wherein "L" is the number of all the pixels constituting the target line. Further, the target line of "j=5", for example, includes, from the left, zero ON pixel, five OFF pixels, two ON pixels, two OFF pixels, . . . . Thus, the CPU 32 generates a numerical array (0, 5, 2, 2, 2, 2, 6, 4, 2, . . . ) as the target line information.

In S110, the CPU 32 selects one array group from the target line information generated in S100. The array group indicates continuous five numerals from among the plurality of numerals included in the target line information, with a numeral corresponding to an ON pixel being positioned leftmost. For example, after the CPU 32 generates the target line information (0, 5, 2, 2, 2, 2, 6, 4, 2, . . . ) for the line of "j=5", the CPU 32 selects an array group (0, 5, 2, 2, 2) when the process of S110 is executed for the first time. The CPU 32 selects an array group (2, 2, 2, 2, 6) when the process of S110 is executed for the second time, that is, when the process of S110 is executed after the judgment in S130 (to be described later) becomes negative. The CPU 32 selects an array group (2, 2, 6, 4, 2) when the process of S110 is executed for the third time. When the CPU 32 generates in S100 target line information such that the target line information is composed of less than five numerals (e.g., when the CPU 32 generates target line information for the line of "j=0"), the CPU 32 skips S110 to S130 and ends the processing routine of FIG. 4.

In S112, the CPU 32 determines whether or not there exists any thick bar candidate in the array group selected in S110. Particularly, the CPU 32 determines whether or not one or more continuous ON pixels corresponding to a center value in the selected array group (hereinafter, referred to as "center ON pixel group") is a candidate of a pixel group constituting a thick bar. Specifically, the CPU 32 determines whether or not three parameters "nc", "min", and "max" obtained from the selected array group satisfy the following expressions (a) to (c):

nc=min  (a)

nc/min<2  (b)

max/min>4  (c)

The parameter "nc" is the center value in the selected array group, i.e., the number of pixels included in the center ON pixel group. For example, in the array group (2, 2, 6, 4, 2), the parameter "nc" is "6". The parameters "min" and "max" are the minimum and maximum values, respectively, in the selected array group.

The expression (a) is "nc=min". As described above, there exist barcodes of various standards such as JAN code and EAN code. Generally, in any of the mentioned standards, each barcode includes one or more thick bars, one or more thin bars, and two or more blanks having two or more different widths. Further, generally, the width of the thin bar and the width of the minimum blank are equal to each other. Here, a specific situation is assumed where the barcode includes one thick bar, two bars positioned on both sides of the thick bar, and two blanks positioned between the thick bar and the two bars. Generally, in this specific situation, the two bars on both sides of the thick bar and the two blanks include at least one of the thin bar and the minimum blank. Thus, when the selected array group corresponds to the above-described specific situation, the number of pixels "nc" included in the center ON pixel group is larger than the minimum value "min" in the selected array group. Accordingly, when the expression (a) is satisfied, the CPU 32 determines that the selected array group does not correspond to the above-described specific situation and therefore that the center ON pixel group is not a thick bar candidate (NO in S112).

The expression (b) is "nc/min<2". Generally, in any of the mentioned standards, the width of the thick bar is greater than or equal to twice the width of the thin bar (i.e., width of the minimum blank). Thus, when the selected array group corresponds to the above-described specific situation, the number of pixels "nc" included in the center ON pixel group is greater than or equal to twice the number of pixels "min" corresponding to the width of the thin bar (i.e., width of the minimum blank). That is, when the expression (b) is satisfied, the CPU 32 determines that the selected array group does not correspond to the above-described specific situation (NO in S112).

The expression (c) is "max/min>4". Generally, in any of the mentioned standards, the width of the thick bar or maximum blank is smaller than or equal to four times the width of the thin bar (i.e., width of the minimum blank). Thus, when the selected array group corresponds to the above-described specific situation, the number of pixels "max" corresponding to the width of the thick bar or maximum blank is smaller than or equal to four times the number of pixels "min" corresponding to the width of the thin bar (i.e., width of the minimum blank). That is, when the expression (c) is satisfied, the CPU 32 determines that the selected array group does not correspond to the above-described specific situation (NO in S112).

When at least one of the expressions (a) to (c) is satisfied, the CPU 32 determines that the selected array group does not correspond to the above-described specific situation, that is, determines that the center ON pixel group is not a thick bar candidate (NO in S112). Then, the CPU 32 skips S120 and advances to S130. For example, in the target line information for the line of "j=5", the expression (c) is satisfied (5/0>4) for the first array group (0, 5, 2, 2, 2), so that the determination in S112 becomes negative. For the second array group (2, 2, 2, 2, 6), the expressions (a) and (b) are satisfied (2=2, and 2/2<2), so that determination in S112 becomes negative. When none of the expressions (a) to (c) is satisfied for some array group, the CPU 32 determines that the array group corresponds to the above-described specific situation. In other words, the CPU 32 determines that the center ON pixel group in the array group is a thick bar candidate (YES in S112), and advances to S120. For example, for the third array group (2, 2, 6, 4, 2), none of the expressions (a) to (c) is satisfied, so that the determination in S112 becomes affirmative. In this way, according to the present embodiment, a thick bar candidate is identified as matching such a feature that is common to the barcodes of the plurality of standards and is related to the widths of the respective bars constituting each barcode (i.e., YES in S112). Accordingly, a thick bar candidate can be adequately identified in the original sheet irrespective of the standard of the barcode.

As a modification, the expression (a) need not be used in S112. This is because, in general, determination on whether or not a thick bar candidate exists can be accomplished only by the expressions (b) and (c). As another modification, an expression other than the expressions (a) to (c) may be used. In short, any expression may be used as long as the expression uses the feature that is common to the barcodes of the plurality of standards and is related to the widths of the respective bars constituting each barcode.

In 120, the CPU 32 executes generation or update of connection information. The connection information is information concerning the center ON pixel group for which determination in S112 has become affirmative (hereinafter, referred to as "candidate group"). Particularly, the connection information is information for connecting (associating) a plurality of candidate groups in the Y-direction. It is noted that when a candidate group identified in the present target line (which will be referred to as "present candidate group" hereinafter) cannot be connected with any of candidate groups identified in a previous target line that is immediately above the present target line (which will be referred to as "previous candidate groups" hereinafter), the CPU 32 generates new connection information including the present candidate group. On the other hand, when the present candidate group can be connected with some previous candidate group, the CPU 32 updates the already-generated connection information including the previous candidate group according to the contents of the present candidate group.

In S130, the CPU 32 determines whether or not all the array groups included in the target line information have been selected in S110. When all the array groups included in the target line information have not yet been selected (NO in S130), the process returns to S110, in which the CPU 32 selects a new array group in the present target line. On the other hand, when all the array groups included in the target line information have been selected (YES in S130), the CPU 32 ends the processing routine of FIG. 4.

(Generation or Update of Connection Information; FIG. 5)

With reference to FIG. 5, the contents of the processing executed in S120 of FIG. 4 will be described. The connection information includes a plurality of parameters P1 to P7. The parameter P1 is the center coordinates of the uppermost candidate group in one or more connected candidate groups. The parameter P2 is the number of connected candidate groups (hereinafter, referred to as "Y-direction connection number"). The parameter P3 is the left-end coordinate of the present candidate group. The parameter P4 is the number of pixels in the present candidate group. The parameter P5 is a decoding flag indicating "ON" or "OFF". The decoding flag "ON" indicates that decoding processing using the connection information including this decoding flag has been executed in S62 (FIG. 3). The decoding flag "OFF" indicates that decoding processing using the connection information has not been executed. The parameter P6 is the number of blanks that can be incremented in processing of FIG. 10 to be described later. The parameter P7 is the inclination of the present candidate group relative to the previous candidate group.

In the binary image 120 of FIG. 5, it is assumed a situation where the present candidate group is identified from the target line of "j=5". On the target line of "j=4", there exists no candidate group that is connected with the present candidate group. Therefore, in S120, new connection information is generated. The connection information generated this time includes P1=(16, 5), P2=1, P3=13, P4=6, P5=OFF, P6=0, and P7=0. When the present candidate group is identified from the target line of "j=6", the present candidate group and previous candidate group are adjacent to each other, so that the present candidate group and previous candidate group can be connected to each other. Thus, in S120, the connection information is updated according to the contents of the present candidate group. Specifically, "P2=1" is updated to "P2=2" as indicated by underlined lines. Similarly, when the candidate group is identified from the target lines of "j=7" to "j=9" in succession, P2 is updated in succession to finally become "P2=5" as indicated by underlines in FIG. 5.

When the present candidate group is identified from the target line of "j=10", the present candidate group and previous candidate group are adjacent to each other, so that the present candidate group and previous candidate group can be connected to each other. Thus, in S120, the connection information is updated according to the contents of the present candidate group. It is noted that the left-end coordinate of the present candidate group is positioned leftward of the left-end coordinate of the previous candidate group. This means that the thick bar (i.e., barcode) is inclined in the scan image 112. In this example, "P2=5" is updated to "P2=6", "P3=13" is updated to "P3=12", and "P7=0" is updated to "P7=−1" as indicated by underlines in FIG. 5. The inclination P7 is a value obtained by subtracting the value of P3 (e.g., 13) determined in the previous target line (e.g., "j=9") immediately above the present target line from the value of P3 (e.g., 12) determined in the present target line (e.g., "j=10"). Alternatively, the inclination P7 may be a value calculated by the following expression:

$$\{(P3+P4/2)-(\text{X-coordinate of P1})\}/(j-\text{Y-coordinate of P1}).$$

For example, in the connection information for the line of "j=10", P7 is calculated as follows:

$$\{(12+6/2)-16\}/(10-5)=-1/5.$$

As described above, the CPU 32 selects, in S50 (FIG. 3), one set of connection information (target connection information) from among the generated one or more sets of connection information, and determines in S52 whether or not the target connection information satisfies the predetermined condition. The predetermined condition is that the decoding flag P5 in the target connection information indicates "OFF" and that the Y-direction connection number P2 in the target connection information is greater than or equal to a predetermined first threshold Th1 (e.g., 10). In the case where the target connection information indicates a thick bar, the Y-direction connection number P2 gradually increases as the Y-coordinate "j" of the target line increases through the process of S92, with a result that the determination in S52 becomes affirmative, and the processing advances to S60. On the other hand, in the case where the target connection information indicates an object (e.g., character) other than a thick bar, the Y-direction connection number P2 does not increase from a relatively small number, even though the Y-coordinate "j" of the target line increases. In this case, the determination in S52 continues being negative, and the processes of S60 to S68 are not executed. That is, the processes of S60 to S68 are not executed for those objects other than thick bars, so that a processing load is reduced.

(Barcode Image Identification processing; FIG. 6)

With reference to FIG. 6, the contents of the barcode image identification processing executed in S60 of FIG. 3 will be described. It is now assumed that in the binary image 120 of FIG. 6, the line of "j=14" is the present target line, and a plurality of connected candidate groups indicated by the target connection information are illustrated as groups of ON pixels surrounded by solid lines. The connection number P2 in the target connection information reaches the first threshold Th1 (ten (10) in this example), so that, in S52 (FIG. 3), the predetermined condition is satisfied and the process proceeds to S60.

In the barcode image identification processing of S60, first in S200, the CPU 32 identifies, from a line immediately below the target line (e.g., a line of "j=15"), one or more ON pixels 260 that is adjacent to the lowermost candidate group 250 among the plurality of connected candidate groups. The one or more ON pixels identified in S200 (hereinafter, referred to as "adjacent group") need not be such a group that can make the judgment in S112 (FIG. 4) affirmative. That is, the CPU 32 identifies the adjacent group 260 without executing determination of S112. In the example of FIG. 6, the adjacent group 260 is illustrated as a group of ON pixels surrounded by dashed lines. Then, the CPU 32 identifies, from a line two rows below the target line (e.g., a line of "j=16"), a new adjacent group 262 including one or more ON pixels adjacent to the identified adjacent group 260. The CPU 32 repeats the above-described processing until there is no more new adjacent group that is adjacent to the already-identified adjacent group. In the example of FIG. 6, adjacent groups 260 to 268 are identified from the lines of "j=15" to "j=19", and no adjacent group is identified from the line of "j=20". The CPU 32 can connect (associate) one or more adjacent groups to (with) the plurality of connected candidate groups by executing processing of S200. A combination of the plurality of candidate groups and one or more adjacent groups represents an ON pixel group constituting a thick bar, and is referred to as a "thick bar group (200, in this example)" hereinafter. The CPU 32 identifies the adjacent groups 260 to 280 without executing determination of S112 of FIG. 4 and thus can quickly identify the thick bar group 200. It is noted that when no adjacent group can be identified, the CPU 32 does not execute the process of S200 and advances to S202.

In S202, the CPU 32 identifies center coordinates P8 of the lowermost adjacent group 268 constituting the thick bar group 200 ((14, 20) in the example of FIG. 6). Then, the CPU 32 identifies the inclination of a line segment connecting the coordinates P1 in the target connection information (i.e., the center coordinates of the uppermost candidate group) and the identified coordinates P8. The identified inclination indicates the direction in which the thick bar extends in the scan image 112. In the example of FIG. 6, the direction in which the thick bar extends does not coincide with the Y-direction of the binary image 120. The following two causes can be considered as the cause of the inclination of the thick bar. The first cause is that the barcode is inclined with respect to a printing medium when being printed. The second cause is that the barcode is not inclined in the original sheet, but the original sheet is read in an inclined state. Specifically, the original sheet is read in an inclined state when the original sheet is placed on a transparent plate of the scanner 50 in an inclined state thereto, or the original sheet is conveyed in an inclined state by an automatic document feeder of the scanner 50.

In S210, the CPU 32 identifies a reference line by using the coordinates P8 and inclination identified in S202. The reference line will be described with reference to FIG. 7. Hatched and black rectangles represent the ON pixels constituting the reference line, and white and black circles represent the OFF pixels constituting the reference line. In order to determine the reference line, the CPU 32 first identifies, as a reference pixel BP, an ON pixel at which a line segment connecting the coordinates P1 and P8 crosses the lowermost candidate group in the plurality of candidate groups constituting the thick bar group 200 (e.g., candidate group 250 in FIG. 6). Then, the CPU 32 identifies, as the reference line, a line that passes the reference pixel BP and has an inclination normal to (perpendicular to) the inclination identified in S202. The direction in which the reference line extends (hereinafter, referred to as "reference direction") is the direction normal to the direction in which the bars of barcode extend, i.e., the left-right direction of the barcode.

In S212 of FIG. 6, the CPU 32 determines the reference number of blanks by using the reference line identified in S210. The reference number of blanks will be described with reference to FIG. 7. The CPU 32 first identifies, on the reference line, an ON pixel group that includes the reference pixel BP, and determines the number of pixels included in the identified ON pixel group ("6" in the example of FIG. 7). Then, the CPU 32 identifies, on the reference line, an OFF pixel group that is at the left side of the identified ON pixel group and adjacent to the identified ON pixel group, and determines the number of pixels in the identified OFF pixel group ("2" in the example of FIG. 7). Subsequently, the CPU 32 identifies, on the reference line, an ON pixel group that is at the left side of the identified OFF pixel group and adjacent to the identified OFF pixel group, and determines the number of pixels in the identified ON pixel group ("2" in the example of FIG. 7). Similarly, on the reference line at the right side of the ON pixel group including the reference pixel BP, the CPU 32 determines the number of pixels included in an OFF pixel group ("4" in the example of FIG. 7) and number of pixels included in an ON pixel group ("2" in the example of FIG. 7). Thus, in the example of FIG. 7, the CPU 32 identifies five numerals "2, 2, 6, 4, 2" from the left.

Figure 7:
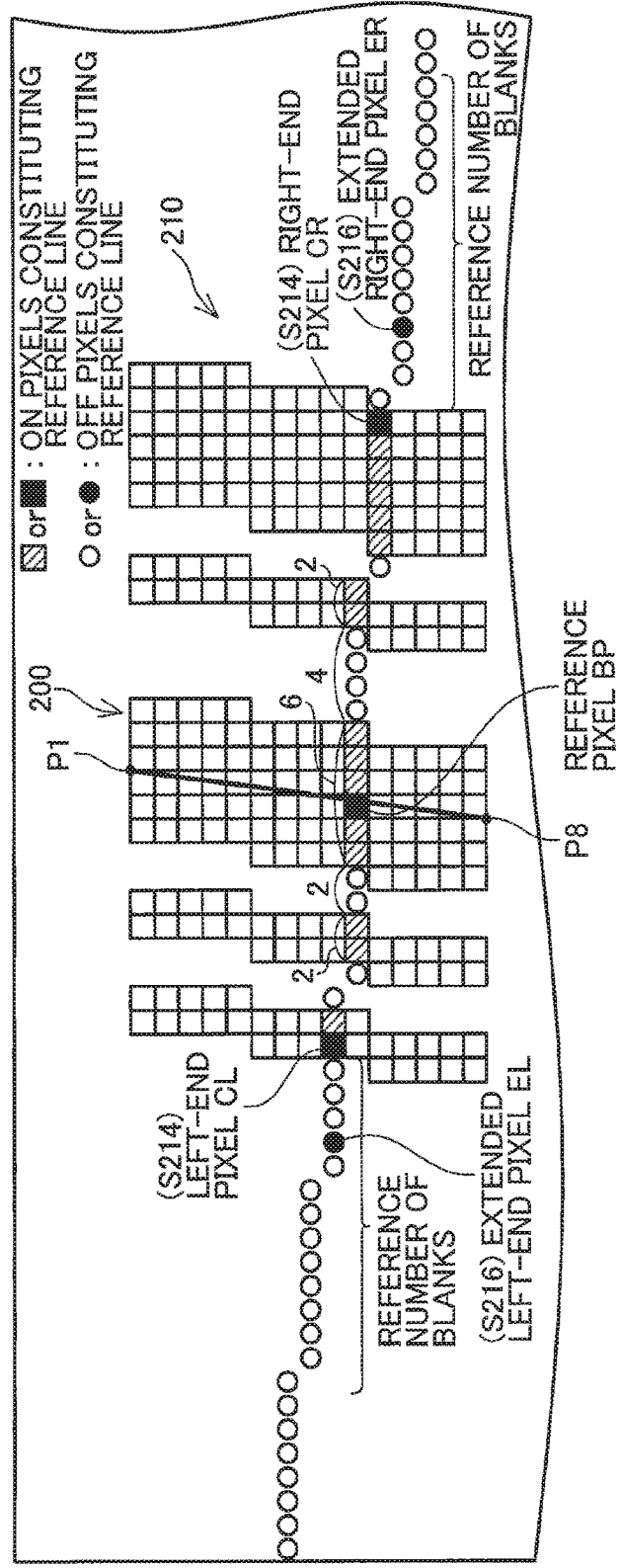
FIG. 7 illustrates how to determine end positions of a barcode.

Then, the CPU 32 identifies the minimum value from among the determined five numerals ("2" in the example of FIG. 7). As described above, in the specific situation where the barcode includes one thick bar, two bars positioned on both sides of the thick bar, and two blanks positioned between the thick bar and the two bars, the two bars on both sides of the thick bar and the two blanks include at least one of the thin bar and minimum blank. Further, generally, the width of the thin bar and the width of the minimum blank are equal to each other. Therefore, the identified minimum value indicates the number of pixels corresponding to the width of the thin bar constituting the barcode (i.e., the minimum blank). Then, the CPU 32 determines the reference number of blanks (e.g., "14") by multiplying the minimum value by a predetermined value (e.g., "7"). It is noted that the predetermined value used to determine the reference number of blanks is previously set to such a value that ensures that a length corresponding to the reference number of blanks exceeds the width of the maximum blank that can be included in the barcode. An original sheet generally includes blanks on both sides of the barcode. The reference number of blanks serves as a parameter for searching for the blanks on both sides of a barcode. That is, the blanks, whose lengths are greater than or equal to the reference number of blanks, are not the blanks positioned between the two bars constituting the barcode, but the blanks existing on both sides of the barcode. Identifying the blanks existing on both left and right sides of the barcode enables identification of the left and right end positions of the barcode.

In S214 of FIG. 6, the CPU 32 identifies the both-end coordinates of the barcode by using the reference line identified in S210 and the reference number of blanks determined in S212. The contents of the processing of S214 will be described with reference to FIG. 7. On the reference line, the CPU 32 first searches for a blank area (i.e., OFF pixel group) having the number of pixels greater than or equal to the reference number of blanks ("14" in the example of FIG. 7) at both the left and right sides of the thick bar group 200. In the example of FIG. 7, the CPU 32 can find a left side blank area and a right side blank area. Then, the CPU 32 identifies, on the reference line, an ON pixel that is at the right side of the found left side blank area and adjacent to the left side blank area, and determines the identified ON pixel as a left-end pixel CL constituting the left end of the barcode. Similarly, the CPU 32 identifies, on the reference line, an ON pixel that is at the left side of the found right side blank area and adjacent to the right side blank area, and determines the identified ON pixel as a right-end pixel CR constituting the right end of the barcode. Thus, the CPU 32 identifies the left and right end positions of the barcode by identifying the left-end pixel CL and right-end pixel CR. Alternatively, the CPU 32 may identify the rightmost OFF pixel included in the found left side blank area as the left-end pixel CL, and identify the leftmost OFF pixel included in the found right side blank area as the right-end pixel CR. In short, the CPU 32 may identify the boundaries between the barcode and the blank areas.

Figure 8:
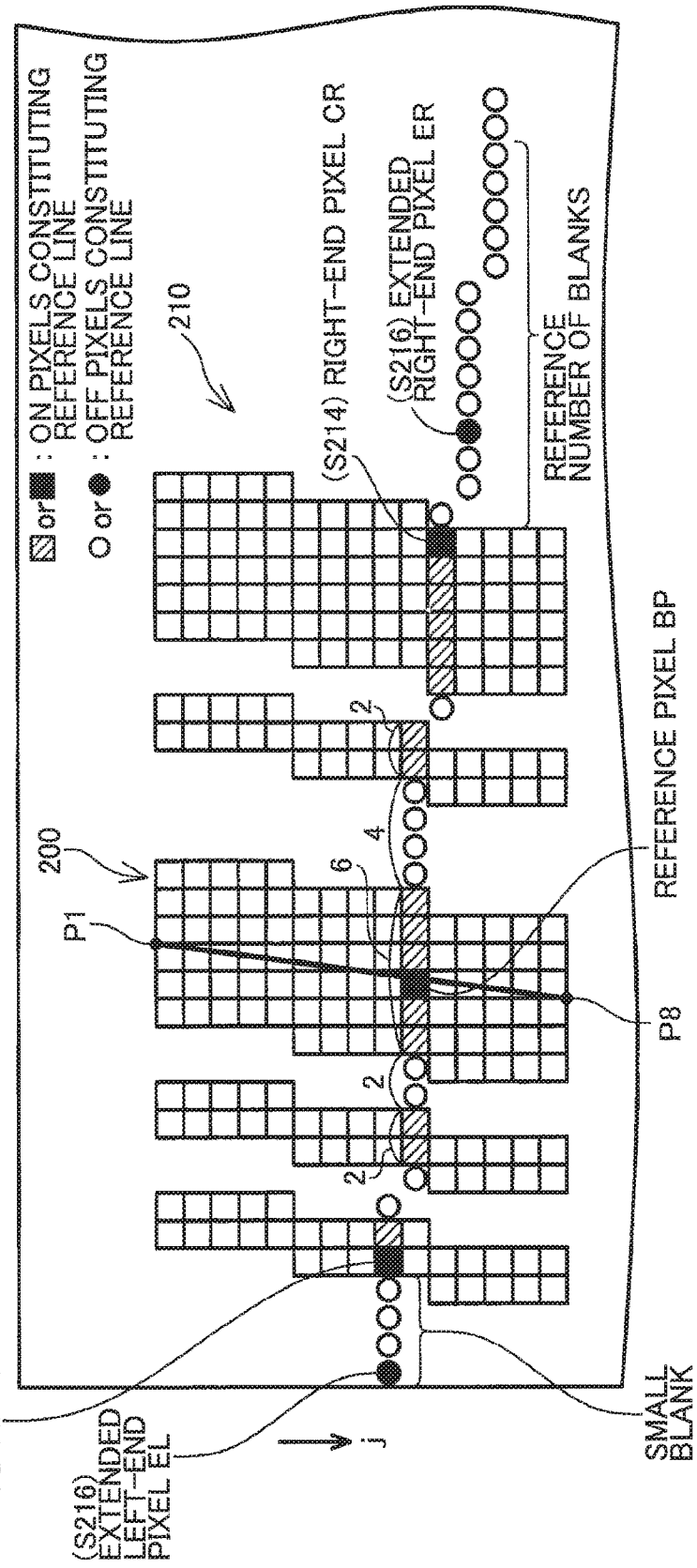
FIG. 8 illustrates how to determine an end position of a barcode when the end of the barcode is close to an end of an original sheet.

For example, when the barcode exists at a position near the left end or right end of the original sheet, no large blank exists on the left or right side of the barcode. In the example of FIG. 8, the left side of the original sheet and the left side of the barcode are in proximity to each other, so that only a small blank area composed of four (smaller than the reference number of blanks) OFF pixels exists on the left side of the thick bar group 200. In this case, although there is no blank area having the number of pixels greater than or equal to the reference number of blanks, the CPU 32 identifies, on the reference line, an ON pixel that is at the right side of the small blank area and is adjacent to the small blank area, and determines the identified ON pixel as the left-end pixel CL. Specifically, in S214, after having found that there is no blank area having the number of pixels greater than or equal to the reference number of blanks on the left side of the thick bar group 200 on the reference line, the CPU 32 further determines whether or not the distance between the left end of the binary image 120 on the reference line and the leftmost ON pixel CL on the reference line (four pixels, in this example) is smaller than a predetermined distance (e.g., ten (10) pixels). When the distance is smaller than the predetermined distance, the CPU 32 determines that only a small blank area exists at the left side of the barcode due to closeness between the left end of the original sheet and the left end of the barcode and then identifies the left-end pixel CL.

Although not illustrated, the right-end pixel CR is identified in the similar manner as described above when only a small blank area exists on the right side of the thick bar group 200 due to closeness between the right end of the original sheet and the right end of the barcode. In this manner, the CPU 32 can adequately identify the end position of the barcode even when only a small blank area exists due to the closeness between the end of the original sheet and the end of the barcode. Alternatively, the CPU 32 need not consider the end of the binary image 120. That is, when only a small blank area exists at the left end or right end of the barcode, the CPU 32 need not identify the left-end pixel CL or right-end pixel CR, and need not identify the barcode image.

In S216 of FIG. 6, the CPU 32 identifies, on the reference line, a pixel that is separated to the left from the left-end pixel CL identified in S214 by a predetermined length (e.g., three pixels). This corresponds to identification of a position obtained by extending the left end of the barcode to the left. The thus identified pixel is referred to as "extended left-end pixel EL" as shown in FIGS. 7 and 8. Similarly, the CPU 32 identifies, on the reference line, a pixel that is separated to the right from the right-end pixel CR identified in S214 by the predetermined length as an extended right-end pixel ER as shown in FIGS. 7 and 8. Thus identifying the extended end pixels EL and ER ensures that a barcode image identified in the next processing step of S220 contains the left and right ends of the barcode. Alternatively, in place of identifying the extended end pixels EL and ER, the CPU 32 may use the left-end pixel CL and right-end pixel CR to identify the barcode image.

Figure 9A:
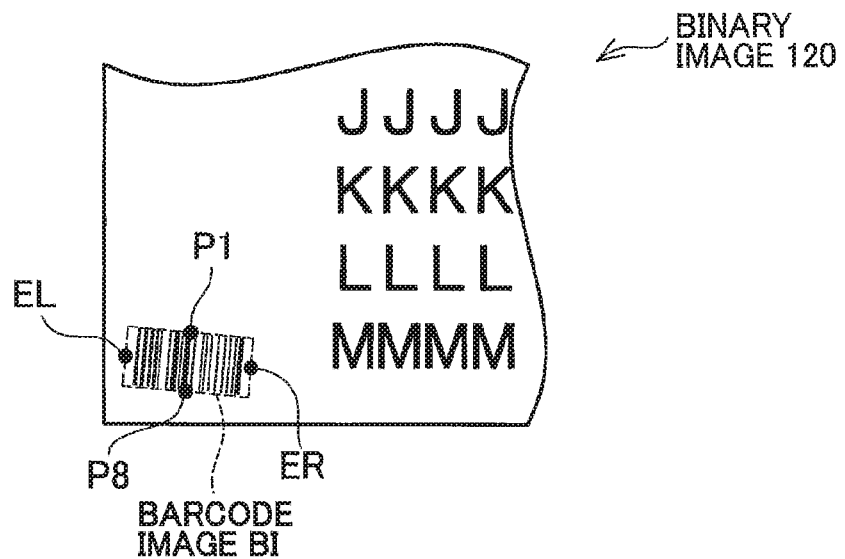
FIG. 9A illustrates how to identify a barcode image in a binary image.

In S220, the CPU 32 identifies the barcode image by using the identified four coordinates P1, P8, EL, and ER and inclination identified in S202. The contents of this processing will be described with reference to FIG. 9A. The CPU 32 first identifies an area having a rectangular shape defined by the four coordinates P1, P8, EL, and ER from the binary image 120. Then, when the value of the inclination indicates that the barcode is inclined, that is, when the X-coordinates of the coordinates P1 and P8 do not coincide with each other, the CPU 32 rotates the identified area according to the identified inclination to generate a barcode image BI in which the extending direction of each bar and Y-direction coincide with each other. On the other hand, when the value of the inclination indicates that the barcode is not inclined, that is, when the X-coordinates in the coordinates P1 and P8 coincide with each other, the CPU 32 determines the identified area as the barcode image BI without rotating the identified area. When the process of S220 is completed, the processing in FIG. 6 is ended.

Figure 9B:
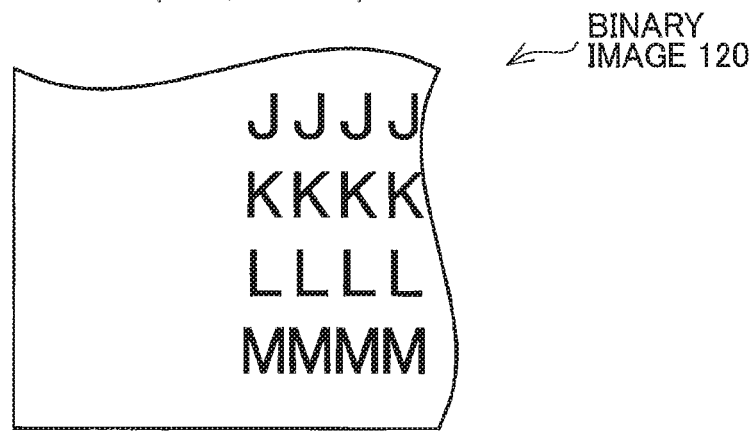
FIG. 9B illustrates how to delete the barcode image from the binary image.

As described above, after identifying the barcode image BI in S60 of FIG. 3, the CPU 32 can decode and delete the barcode image BI (S62, and S66). FIG. 9B illustrates the state of the binary image 120 from which the barcode image BI has been deleted. This prevents the same barcode image BI from being identified again, whereby the processing load is reduced.

In S68 of FIG. 3, the CPU 32 deletes the target connection information and executes the flag change processing. When the barcode image BI includes two or more thick bar groups, that is, when the barcode image BI includes both of the thick bar group indicated by the target connection information and another thick bar group indicated by another set of connection information, the CPU 32 executes the flag change processing to change the decoding flag P5 in the another set of connection information from "OFF" to "ON". In the examples of FIG. 7 and FIG. 8, not only the thick bar group 200 indicated by the target connection information but also another thick bar group 210 exist in the barcode image BI. Accordingly, in S40 of FIG. 3, not only the connection information indicating the thick bar group 200 but also connection information indicating the thick bar group 210 is generated. In S68, the CPU 32 deletes the target connection information to prevent the processing concerning the thick bar group 200 from continuing. The CPU 32 knows that the thick bar group 210 also exists within the barcode image BI by comparing the coordinates P1 in the connection information for the thick bar group 210 and the coordinates P1, P8, EL, and ER of the barcode image BI. Accordingly, the CPU 32 further changes the decoding flag P5 in the connection information for the thick bar group 210 from "OFF" to "ON". This ensures that the judgment in S52 on the connection information for the thick bar group 210 will become negative, and the barcode image BI is prevented from being identified again based on the thick bar group 210, which reduces the processing load. Alternatively, the connection information may not include the decoding flag P5, and the CPU 32 may not execute the flag change processing in S68.

(Connection Information Deletion Processing; FIG. 10)

With reference to FIG. 10, the contents of the connection information deletion processing executed in S80 of FIG. 3 will be described. The connection information deletion processing is processing for deleting such connection information that is not the target connection information deleted in S68, but indicates an object (e.g., character) other than a thick bar.

In the connection information deletion processing of S80, first, in S300, the CPU 32 selects one set of connection information (hereinafter, referred to as "specific connection information") from among one or more sets of connection information stored in the memory 34. When there is no connection information in the memory 34, the CPU 32 skips S310 to S340 and ends the processing routine of FIG. 10.

In S310, the CPU 32 determines whether or not the CPU 32 has generated or updated the specific connection information when the CPU 32 has executed the processing of S40 in FIG. 3 to the present target line "j". The fact that generation or update of the specific connection information has not been executed at the present target line means that no new candidate group has been connected to the specific connection information at the present target line. For example, it is now assumed that in the binary image 120 of FIG. 10, the line of "j=11" is the present target line, and no ON pixel exists on the target line of "j=11" at a position that is adjacent to the previous candidate group 300 on the previous target line of "j=10". It is noted that when a barcode is not printed properly in an original sheet, a part of a thick bar in the barcode may lack in the original sheet. In such a case, a disadvantage occurs in which the candidate group 300 fails to be connected with a new candidate group. When generation or update of the specific connection information has been executed on the target line in S40 (YES in S310), the CPU 32 skips S320 to S332 and advances to S340. On the other hand, when generation or update of the specific connection information has not been executed on the target line in S40 (NO in S310), the CPU 32 advances to S320.

In S320, the CPU 32 increments the blank number P6 in the specific connection information. Then, in S322, the CPU 32 increments the connection number P2 in the specific connection information. As a result, in the example of FIG. 10, the blank number P6 and the connection number P2 are incremented to "1" and "7", respectively. Further, in S322, the CPU 32 changes the left-end coordinate P3 in the specific connection information as needed. Specifically, the CPU 32 assumes that a virtual candidate group 310 is connected to the candidate group 300 according to the inclination P7 included in the specific connection information, although the virtual candidate group 310 is not connected actually. The virtual candidate group 310 has the number of pixels coinciding with the pixel number P4. In the example of FIG. 10, the virtual candidate group 310 is composed of six OFF pixels denoted by X marks. Note that the virtual candidate group 310 may not be composed of OFF pixels only, but may include one or more ON pixel. Since the inclination P7 indicates "−1", the CPU 32 determines the virtual candidate group 310 such that the virtual candidate group 310 is positioned leftward of the candidate group 300. In this case, the CPU 32 changes the left-end coordinate P3 in the specific connection information from "12" to "11".

In S330, the CPU 32 determines whether or not the blank number P6 incremented in S320 has become greater than or equal to a second threshold Th2 (e.g., "3"). When the blank number P6 has reached the second threshold Th2 (YES in S330), the CPU 32 deletes the specific connection information in S332 and advances to S340. The fact that the blank number P6 has reached the second threshold Th2 means that the specific connection information is highly likely to indicate an object other than a thick bar. Since the specific connection information is thus deleted, it is ensured that processing concerning the specific connection information (e.g., update processing of S120 in FIG. 4, and S50 and S52 in FIG. 3) will not be executed in the subsequent processing steps. Thus, a processing load can be reduced. On the other hand, when the blank number P6 is smaller than the second threshold Th2 (NO in S330), the CPU 32 skips S332 and advances to S340. In this case, the CPU 32 continues processing concerning the specific connection information in the subsequent processing steps.

In S340, the CPU 32 determines whether or not all the sets of connection information have been selected in S300. When all the sets of connection information have not yet been selected (NO in S340), the CPU 32 returns to S300, where the CPU 32 selects another set of connection information and executes the processes of S310 to S332 again. On the other hand, when all the sets of connection information have been selected (YES in S340), the CPU 32 ends the processing routine of FIG. 10.

In the example of FIG. 10, on the line of "j=12", a candidate group 320 adjacent to the virtual candidate group 310 exists. Accordingly, when the CPU 32 identifies the candidate group 320 in S112 of FIG. 4, the CPU 32 updates the connection information such that the candidate group 320 is connected to the virtual candidate group 310. The CPU 32 updates the connection number P2 from "7" to "8", the left-end coordinate P3 from "11" to "12", blank number P6 from "1" to "0", and inclination P7 from "−1" to "1" (as indicated by underlines for line of "j=12" in FIG. 10). Then, when determination for the connection information in S52 becomes affirmative (FIG. 3), the CPU 32 will identify a barcode image based on the connection information. In this way, even when a part of a thick bar constituting the barcode lacks, the CPU 32 can properly identify the barcode image. Alternatively, when the determination in S310 becomes negative, the CPU 32 may simply delete the specific connection information in S332 without executing S320 to S330.

Advantages

According to the present embodiment, the PC 10 searches for blank areas, each having the number of pixels greater than or equal to the reference number of blanks, at both of the left and right sides of a thick bar group 200 identified from the binary image 120, to thereby identify the left-end pixel CL and the right-end pixel CR which are left and right side end positions of the barcode, respectively (FIGS. 7 and 8). Then, the PC 10 uses the left-end pixel CL and the right-end pixel CR to identify the barcode image BI including the thick bar group 200 (see FIG. 9A). Therefore, the PC 10 need not perform pattern matching of a guard bar pattern or a center bar pattern, each of which is composed of two or more bars, at each of the both sides and the center of the thick bar group 200. Thus, a processing time required to identify the barcode image BI can be reduced.

Further, as described above, there are known barcodes of various standards such as JAN code and EAN code. When a method that identifies the position of the barcode image BI from an original image by executing pattern matching of the bars is adopted, a plurality of types of pattern matching corresponding to barcodes of a plurality of standards need to be executed if the standard of the barcode included in the original sheet is not known. Accordingly, a processing time required to identify the position of the barcode image BI is increased. Contrarily, in the present embodiment, the PC 10 identifies, as a thick bar candidate, a candidate group that matches the feature that is related to the widths of the bars in the barcodes and is common to the barcodes of the plurality of standards (YES in S112 of FIG. 4), and determines a thick bar group 200 that includes the identified candidate group (S120 in FIG. 4 and S200 in FIG. 6). Thus, irrespective of the standard of the barcode included in an original sheet, the PC 10 can quickly identify the position of the thick bar group 200 in the binary image 120 without performing a plurality of types of pattern matching corresponding to barcodes of a plurality of standards. In general, the blank exists around the barcode, so that the PC 10 searches for the blank areas on both the left and right sides of the thick bar group 200 and identifies the left and right end positions of the barcode. Thus, the PC 10 need not execute processing corresponding to the barcodes of a plurality of standards, in order to identify the position of the barcode image BI, thereby reducing a processing time required to identify the position of the barcode image BI. As a result, the PC 10 can quickly execute output processing concerning the barcode image BI.

(Correspondence Relation)

The PC 10 is an example of "image analyzing apparatus". The binary image data generated in S14 of FIG. 2 is an example of "target image data". The binary images 120, 120A, 120B are each an example of "target image". The OFF pixel, area composed of all the OFF pixels, ON pixel, and area composed of all the ON pixels are examples of "background pixel", "background area", "non-background pixel", and "non-background area", respectively. The left-right direction (X-direction) and up-down direction (Y-direction) of the binary image 120 are examples of "first direction" and "second direction", respectively. The left side, right side, upper side, and lower side are example of "first side", "second side", "third side", and "fourth side", respectively. The reference direction in which the reference line extends is an example of "specific direction". The left side blank area and the right side blank area in FIG. 7 are examples of "first blank area" and "second blank area", respectively. The left side small blank area in FIG. 8 is an example of "first partial background area". The left-end pixel CL and the right-end pixel CR are examples of "first end position" and "second end position", respectively.

The thick bar is an example of "a bar having a first width". The candidate group that makes the judgment of S112 affirmative (FIG. 4) (e.g., candidate group 250 in FIG. 6) is an example of "first partial candidate area". The adjacent groups 260, 262, 264, 266, and 268 connected in S200 (FIG. 6) are examples of "second partial candidate area". The thick bar group 200 (FIG. 7) determined in S200 (FIG. 6) is an example of "bar candidate area". The processing of S112 (FIG. 4) is an example of "existence determination processing". Affirmative judgement in S112 (FIG. 4) is an example of "matching with a feature concerning two or more widths". The line is an example of "line pixel group". The line of "j=5", candidate group on the line of "j=5", line of "j=6", and candidate group on the line of "j=6" in FIG. 5 are an example of "first line pixel group", "first partial candidate area in the first line pixel group", "second line pixel group", and "first partial candidate area in the second line pixel group", respectively. The candidate groups associated with each other in the connection information are an example of "associated area". The thick bar group 200 and the thick bar group 210 in FIGS. 7 and 8 are examples of "first associated area" and "second associated area", respectively. The virtual candidate group 310 in FIG. 10 is an example of "specific area".

The second threshold Th2 used in S330 of FIG. 10 and the first threshold Th1 used in S52 of FIG. 3 are examples of "first predetermined number" and "second predetermined number", respectively. The value "2" used in the expression (b) in S112 (FIG. 4) and the value "4" used in the expression (c) are examples of "first predetermined value" and "second predetermined value", respectively. The predetermined value used for determining the reference number of blanks in S212 (e.g., predetermined value=7 in FIG. 7) is an example of "third predetermined value". The predetermined numbers and predetermined values described above can be changed appropriately.

While the description has been made in detail with reference to the specific embodiment thereof, it would be apparent to those skilled in the art that various changes and modifications may be made therein without departing from the spirit and scope of the above described aspects.

Modification 1

For example, the CPU 32 may not generate connection information in S120 when the CPU 32 has identified a candidate group in S112 of FIG. 4. In this case, the CPU 32 may determine the Y-coordinate of the identified candidate group as an upper end position of a barcode, and determine a position separated downward from the identified candidate group by a predetermined number of pixels as a lower end position of the barcode. Then, the CPU 32 may search for blank areas on both the left and right sides of the identified candidate group. In short, no associated area need be determined, in order to identify the thick bar candidate.

Modification 2

When decoding processing of a barcode image has been successfully executed in S64 of FIG. 3, the CPU 32 may end the processing routine of FIG. 3, without executing the processing concerning subsequent target lines. In this case, a plurality of lines from the first target line to the present target line, at which decoding of a barcode image has been successfully executed, are an example of "j number of line pixel groups". That is, the number of pixel groups "j" included in the "j number of line pixel groups" may be smaller than the number of all the pixel lines arranged in the Y-direction of the binary image 120.

Modification 3

The CPU 32 may identify a thick bar group by executing the process of S112 and S120 (FIG. 4), but not executing the process of S200 (FIG. 6). That is, the associated area may include no adjacent groups.

Modification 4

The CPU 32 may not identify the inclination of the thick bar group in S202 of FIG. 6 and may not identify the reference line normal to the inclination of the thick bar group in S210. In this case, for example, the CPU 32 may identify the present target line as the reference line in S210. In this case, the left-right direction of the binary image 120 is an example of "specific direction".

Modification 5

In S112 of FIG. 4, the CPU 32 may determine whether or not there exists any thin bar candidate, in place of determining whether there exists any thick bar candidate. For example, when the center value "nc" satisfies the equation "nc=min", the CPU 32 may determine the center ON pixel group as the thin bar candidate. The CPU 32 may use the thin bar in place of the thick bar in other processing so as to identify a barcode image. That is, the "first width" may be smaller than the second width of the two or more widths. In the present modification, a case where the center value "nc" satisfies the equation "nc=min" is an example of "matching with a feature concerning two or more widths".

Modification 6

In S212 of FIG. 6, the CPU 32 may determine, as the reference number of blanks, a predetermined number of pixels (e.g., 20 pixels) that is determined in advance. In other words, the "threshold value" may not be determined by multiplying the length corresponding to the second width by a predetermined value.

Modification 7

The processing of FIGS. 2 to 10 may be executed by the scanner 50, and a decoded result may be transmitted from the scanner 50 to PC 10 in S66. That is, examples of the "image analyzing apparatus" include the scanner 50. In short, examples of the "image analyzing apparatus" include such devices (e.g., a multifunction machine and a smartphone) that can execute analysis of an image.

Modification 8

In the above-described embodiment, the CPU 32 of the PC 10 executes the driver program 36 (software) to achieve the processing of FIGS. 2 to 10. Alternatively, at least one processing among the processing in FIGS. 2 to 10 may be achieved by hardware such as a logic circuit.

What is claimed is:

1. An image analyzing apparatus comprising a controller configured to perform:
    acquiring target image data by receiving the target image data from a scanner, the scanner being configured to generate the target image data by executing reading of an original sheet, the target image data indicating a target image representative of the original sheet, the target image containing a barcode image as part of the target image, the barcode image representing a one-dimensional barcode, the one-dimensional barcode being composed of a plurality of bars having two or more different widths, the two or more different widths including a first width, the target image containing a background area representative of a background in the original sheet and a non-background area representative of an area other than the background, the target image being composed of a plurality of pixels which are arranged two-dimensionally, the plurality of pixels including background pixels representing the background in the original sheet and non-background pixels representing the area other than the background in the original sheet;
    identifying the barcode image in the target image; and
    executing an output process with respect to the identified barcode image;
    the identifying the barcode image includes:
    determining a bar candidate area in the target image, the bar candidate area representing a candidate for a bar having the first width, the bar candidate area containing a feature-matching area that matches a feature concerning the two or more different widths of the bars in the one-dimensional barcode;
    searching for a first blank area and a second blank area at a first side and a second side, respectively, of the bar candidate area with respect to a specific direction, each of the first and second blank areas being part of the background area and having a length in the specific direction longer than or equal to a threshold value, a number of background pixels continuously arranged in the specific direction in each of the first and second blank areas being greater than or equal to a reference pixel number that corresponds to the threshold value;
    when the first blank area is found at the first side of the bar candidate area, determining, as a first end position of the one-dimensional barcode, coordinates indicative of a two-dimensional position of a boundary between the first blank area and a non-background area that is at a second side of the first blank area and is adjacent to the first blank area;
    when the second blank area is found at the second side of the bar candidate area, determining, as a second end position of the one-dimensional barcode, coordinates indicative of a two-dimensional position of a boundary between the second blank area and a non-background area that is at a first side of the second blank area and is adjacent to the second blank area; and
    by using the first end position and the second end position, identifying an area containing the bar candidate area as the barcode image, and
    the executing the output process includes decoding the identified barcode image.

2. The image analyzing apparatus according to claim 1, wherein the plurality of pixels are arranged two-dimensionally such that two or more pixels are arranged in a first direction and two or more pixels are arranged in a second direction perpendicular to the first direction,
    wherein the feature-matching area contains a first partial candidate area that is composed of one or more non-background pixel that is arranged continuously in the first direction,
    wherein the plurality of pixels contain "j" number of line pixel groups that are arranged in the second direction, "j" being an integer greater than or equal to two (2), each line pixel group containing two or more pixels arranged in the first direction, the "j" number of line pixel groups including a first line pixel group and a second line group adjacent to the first line pixel group,
    wherein the determining the bar candidate area includes:
    when a first partial candidate area exists in the first line pixel group, a first partial candidate area exists in the second line pixel group, and the first partial candidate area in the first line pixel group and the first partial candidate area in the second line pixel group are adjacent to each other, determining an associated area in which the first partial candidate area in the first line pixel group and the first partial candidate area in the second line pixel group are associated with each other; and
    determining the bar candidate area such that the bar candidate area contains the associated area.

3. The image analyzing apparatus according to claim 2, wherein the determining the associated area includes:
    executing an existence determination processing onto at least one line pixel group in the "j" number of line pixel groups in succession from a third side toward a fourth side with respect to the second direction, the existence determination processing executed on a line pixel group determining whether a first partial candidate area exists in the subject line pixel group;

when it is determined that a first partial candidate area exists in an m-th line pixel group through the existence determination processing executed on the m-th line pixel group, determining an associated area such that the associated area contains the first partial candidate area existing in the m-th line pixel group, the m-th line pixel group being positioned m-th from the third side in the second direction, where m is an integer greater than or equal to one (1) and smaller than j, and when it is determined that a first partial candidate area exists in an (m+1)-th line pixel group through the existence determination processing executed on the (m+1)-th line pixel group and the first partial candidate area in the (m+1)-th line pixel group is adjacent to the associated area, updating the associated area such that the updated associated area contains the first partial candidate areas existing in both of the m-th and (m+1)-th line pixel groups, the (m+1)-th line pixel group being positioned (m+1)-th from the third side in the second direction.

4. The image analyzing apparatus according to claim 3, wherein when it is determined that two or more first partial candidate areas exist in the m-th line pixel group through the existence determination processing executed on the m-th line pixel group, two or more associated areas are determined for the two or more first partial candidate areas, respectively, such that each associated area contains the corresponding first partial candidate area, the two or more associated areas including a first associated area and a second associated area, wherein the bar candidate area is determined by using the first associated area such that the bar candidate area contains the first associated area, wherein an area containing the bar candidate area containing the first associated area is identified as the barcode image, and wherein in a case where the identified barcode image contains the second associated area, a bar candidate area containing the second associated area is not determined based on the second associated area.

5. The image analyzing apparatus according to claim 3, wherein the determining the associated area further includes:

when it is determined that no first partial candidate area exists in the (m+1)-th line pixel group at a position adjacent to the associated area, updating the associated area such that the updated associated area further contains a specific area containing one or more background pixel that exists in the (m+1)-th line group and is adjacent to the associated area; and repeatedly updating the associated area such that the updated associated area contains a plurality of specific areas that are arranged continuously in the second direction while a total number of the specific areas continuously arranged in the updated associated area is smaller than a first predetermined number, and wherein when the total number of the specific areas continuously arranged in the updated associated area becomes greater than or equal to the first predetermined number, updating of the associated area is stopped, and a bar candidate area containing the updated associated area is not determined.

6. The image analyzing apparatus according to claim 3, wherein the determining the associated area further includes:

when a number of the first partial candidate areas continuously arranged in the second direction in the updated associated area becomes equal to a second predetermined number as a result of execution of the existence determination processing on an n-th line pixel group that is positioned at an n-th from the third side in the second direction, where "n" is an integer greater than or equal to one (1) and smaller than "j", executing no existence determination processing on an (n+1)-th line pixel group that is positioned at an (n+1)-th from the third side in the second direction, and updating the associated area such that the updated associated area further includes a second partial candidate area that is composed of at least one non-background pixel that is contained in the (n+1)-th line pixel group and is adjacent to the associated area.

7. The image analyzing apparatus according to claim 6, wherein in a case where one or more first partial candidate area and one or more second partial candidate area are contained in the bar candidate area, the specific direction is perpendicular to a direction, in which the one or more first partial candidate area and the one or more second partial candidate area are arranged.

8. The image analyzing apparatus according to claim 2, wherein the two or more different widths further include a second width smaller than the first width, and wherein the determining a bar candidate area further includes:

when three parameters "nc", "min", and "max" obtained from five partial groups contained in a target line pixel group within the "j" number of line pixel groups satisfy none of the following two conditions (1) and (2):

$$nc/min < \text{first predetermined value} \quad (1); \text{ and}$$

$$max/min > \text{second predetermined value} \quad (2),$$

determining that a specific partial group within the five partial groups matches the feature concerning the two or more different widths of the bars in the one-dimensional barcode, wherein the five partial groups include:

a first partial group that is composed of at least one non-background pixel continuously arranged in the first direction;

a second partial group that is adjacent to the first partial group and is composed of at least one background pixel continuously arranged in the first direction;

a third partial group that is adjacent to the second partial group and is composed of at least one non-background pixel continuously arranged in the first direction;

a fourth partial group that is adjacent to the third partial group and is composed of at least one background pixel continuously arranged in the first direction; and a fifth partial group that is adjacent to the fourth partial group and is composed of at least one non-background pixel continuously arranged in the first direction, wherein the parameter "nc" is a number of pixels included in the third partial group, wherein the parameter "min" is a smallest number among numbers of pixels respectively included in the five partial groups, wherein the parameter "max" is a largest number among numbers of pixels respectively included in the five partial groups, wherein the first predetermined value and the second predetermined value are previously determined based on the two or more different widths of the bars in the one-dimensional barcode, and wherein the specific partial group is the third partial group.

9. The image analyzing apparatus according to claim 1, wherein the two or more different widths further include a second width smaller than the first width, and wherein the searching for the first blank area and the second blank area includes determining the reference pixel number by multiplying a number of pixels corresponding to the second width by a third predetermined value.

10. The image analyzing apparatus according to claim 1, wherein when a first partial background area, in which background pixels whose number is smaller than the reference pixel number are arranged in the specific direction, exists in the background area at the first side of the bar candidate area due to closeness between the first side of the original sheet and the first side of the one-dimensional barcode and no first blank area is found at the first side of the barcode area, the coordinates indicative of the two-dimensional position of a boundary between the first partial background area and a non-background area that is at a second side of the first partial background area and is adjacent to the first partial background area is determined as the first end position of the one-dimensional barcode, and wherein when a second partial background area, in which background pixels whose number is smaller than the reference pixel number are arranged in the specific direction, exists in the background area at the second side of the bar candidate area due to closeness between the second side of the original sheet and the second side of the one-dimensional barcode and no second blank area is found at the second side of the barcode area, the coordinates indicative of the two-dimensional position of a boundary between the second partial background area and a non-background area that is at a first side of the second partial background area and is adjacent to the second partial background area is determined as the second end position of the one-dimensional barcode.

11. The image analyzing apparatus according to claim 1, wherein the executing the output process includes decoding the identified barcode image and outputting a decoded result.

12. The image analyzing apparatus according to claim 1, further comprising a memory, wherein the executing the output process further includes: storing the target image data in an area indicated by a decoded result in the memory.

13. A non-transitory computer readable storage medium storing a set of program instructions for an image analyzing apparatus, the image analyzing apparatus including a processor, the program instructions, when executed by the processor, causing the image analyzing apparatus to perform:

acquiring target image data by receiving the target image data from a scanner, the scanner being configured to generate the target image data by executing reading of an original sheet, the target image data indicating a target image representative of the original sheet, the target image containing a barcode image as part of the target image, the barcode image representing a one-dimensional barcode, the one-dimensional barcode being composed of a plurality of bars having two or more different widths, the two or more different widths including a first width, the target image containing a background area representative of a background in the original sheet and a non-background area representative of an area other than the background, the target image being composed of a plurality of pixels which are arranged two-dimensionally, the plurality of pixels including background pixels representing the background in the original sheet and non-background pixels representing the area other than the background in the original sheet;

identifying the barcode image in the target image; and executing an output process with respect to the identified barcode image;

the identifying the barcode image includes:

determining a bar candidate area in the target image, the bar candidate area representing a candidate for a bar having the first width, the bar candidate area containing a feature-matching area that matches a feature concerning the two or more different widths of the bars in the one-dimensional barcode;

searching for a first blank area and a second blank area at a first side and a second side, respectively, of the bar candidate area with respect to a specific direction, each of the first and second blank areas being part of the background area and having a length in the specific direction longer than or equal to a threshold value, a number of background pixels continuously arranged in the specific direction in each of the first and second blank areas being greater than or equal to a reference pixel number that corresponds to the threshold value;

when the first blank area is found at the first side of the bar candidate area, determining, as a first end position of the one-dimensional barcode, coordinates indicative of a two-dimensional position of a boundary between the first blank area and a non-background area that is at a second side of the first blank area and is adjacent to the first blank area;

when the second blank area is found at the second side of the bar candidate area, determining, as a second end position of the one-dimensional barcode, coordinates indicative of a two-dimensional position of a boundary between the second blank area and a non-background area that is at a first side of the second blank area and is adjacent to the second blank area; and by using the first end position and the second end position, identifying an area containing the bar candidate area as the barcode image, and the executing the output process includes decoding the identified barcode image.

14. The non-transitory computer readable storage medium according to claim 13, wherein the two or more different widths further include a second width smaller than the first width, and wherein the searching for the first blank area and the second blank area includes determining the reference pixel number by multiplying a number of pixels corresponding to the second width by a third predetermined value.

15. The non-transitory computer readable storage medium according to claim 13, wherein the image analyzing apparatus further includes a memory, wherein the executing the output process further includes: storing the target image data in an area indicated by a decoded result in the memory.

* * * * *